United States Patent [19]

Nishiyama et al.

[11] Patent Number: 5,268,342
[45] Date of Patent: Dec. 7, 1993

[54] NONREDUCING DIELECTRIC CERAMIC COMPOSITION

[75] Inventors: Toshiki Nishiyama; Yukio Hamaji; Yukio Sakabe, all of Nagaokakyo, Japan

[73] Assignee: Murata Manufacturing Co., Ltd., Japan

[21] Appl. No.: 904,398

[22] Filed: Jun. 25, 1992

[30] Foreign Application Priority Data

| | | | |
|---|---|---|---|
| Jun. 27, 1991 | [JP] | Japan | 3-183577 |
| Jun. 27, 1991 | [JP] | Japan | 3-183578 |
| Jun. 27, 1991 | [JP] | Japan | 3-183579 |
| Jun. 27, 1991 | [JP] | Japan | 3-183580 |
| Aug. 9, 1991 | [JP] | Japan | 3-224739 |
| Aug. 9, 1991 | [JP] | Japan | 3-224740 |
| Aug. 9, 1991 | [JP] | Japan | 3-224741 |
| Sep. 9, 1991 | [JP] | Japan | 3-258318 |
| Sep. 20, 1991 | [JP] | Japan | 3-270159 |

[51] Int. Cl.$^5$ .................................................. C04B 35/46
[52] U.S. Cl. .................................. 501/138; 501/139; 501/32
[58] Field of Search ........................ 501/138, 139, 32

[56] References Cited

U.S. PATENT DOCUMENTS

| | | | |
|---|---|---|---|
| 5,075,819 | 12/1991 | Saito et al. | 501/138 |
| 5,077,636 | 12/1991 | Saito et al. | 501/138 |
| 5,089,932 | 2/1992 | Saito et al. | 501/138 |
| 5,089,933 | 2/1992 | Saito et al. | 501/138 |
| 5,103,369 | 4/1992 | Saito et al. | 501/138 |

FOREIGN PATENT DOCUMENTS

| | | | |
|---|---|---|---|
| 0034905 | 3/1974 | Japan | 501/139 |
| 0208003 | 12/1982 | Japan | 501/139 |
| 0028103 | 2/1983 | Japan | 501/138 |
| 0020905 | 2/1984 | Japan | 501/138 |

*Primary Examiner*—Mark L. Bell
*Assistant Examiner*—Deborah Jones
*Attorney, Agent, or Firm*—Ostrolenk, Faber, Gerb & Soffen

[57] ABSTRACT

A nonreducing dielectric ceramic composition that includes $BaTiO_3$ as a main component, the $BaTiO_3$ containing alkali metal oxides in an amount more than 0.04 weight % as impurities. One or more of the following rare earth metal oxides ($Re_2O_3$): $Tb_2O_3$, $Dy_2O_3$, $Ho_2O_3$ and $Er_2O_3$; and $Co_2O_3$ in the following ratios: $BaTiO_3$ is 92.0–00.4 mol %; $Re_2O_3$ is 0.3–4.0 mol %; and $Co_2O_3$ is 0.3–4.0 mol %; the composition also includes the following subcomponents: 0.2–4.0 mol % BaO; 0.2–3.0 mol % of MnO; and 0.5–5.0 mol % of MgO. The composition may include 0.5–2.5 weight parts of oxide glass containing $BaO-SrO-Li_2O-SiO_2$ incorporated with 100 weight parts for the above composition. The composition may also include 0.5–4.0 mol % $CaTiO_3$, 0.5–3.5 mol % $CaZrO_3$ or one or both of NiO and $Al_2O_3$ in an amount 0.3–3.0 mol %. Further, 0.5–2.5 weight parts of oxide glass containing $BaO-SrO-Li_2O-SiO_2$ may be incorporated with 100 weight parts of the composition. $SiO_2$ in an amount of 0.2–3.0 mol % or one or both of NiO and $Al_2O_3$ in an amount of 0.3–3.0 mol % may be incorporated in the composition. CaO or SrO may be substituted for BaO.

9 Claims, 1 Drawing Sheet

NONREDUCING DIELECTRIC CERAMIC COMPOSITION

BACKGROUND OF THE INVENTION

1. Field of the Invention

The present invention relates to a nonreducing dielectric ceramic composition and, more particularly, to a composition used as a dielectric material for monolithic capacitors which include a base metal, such as nickel, as an internal electrode material.

2. Description of the Prior Art

Conventional dielectric ceramic materials are reduced to a semiconductive material when fired under neutral or reducing low partial pressure of oxygen. Therefore, a noble metal such as Pd or Pt should be used as an internal electrode material because they do not melt at sintering temperatures of the dielectric ceramic material and are not oxidized with the dielectric ceramic materials even if the sintering is carried out with a high partial pressure of oxygen. However, the use of such a noble metal is an obstacle to reduction of the manufacturing costs of monolithic ceramic capacitors.

Thus, in order to solve the above problem, it is desired to use a base metal such as Ni as an internal electrode material. However, when using such a base metal as the internal electrode material, it oxidizes and does not function as an electrode. Therefore, in order to use such a base metal as the internal electrode material, a dielectric ceramic material must be used which does not reduce to a semiconductive material even when fired in a neutral or reducing atmospheric gas having a low oxygen partial pressure but yet has a sufficient resistivity and a superior dielectric property. A dielectric ceramic material which meets these requirements is, for example, a $BaTiO_3$-$CaZrO_3$-$MnO$-$MgO$-based composition disclosed in Japanese patent Application Laid-Open No. 62-256422 (1987), or a $BaTiO_3$— $(Mg, Zn, Sr, Ca)O$-$B_2O_3$-$SiO_2$-based composition disclosed in Japanese patent publication No. 61-14611 (1986).

However, in the nonreducing dielectric ceramic composition disclosed in Japanese Patent Application Laid Open No. 62-256422 (1987), $CaZrO_3$ or $CaTiO_3$ produced in the firing process is apt to provide a secondary phase with Mn or the like, and thus this would lead to danger of impairing reliability of the composition in a high temperature range.

Also, the composition disclosed in Japanese Patent Publication No. 61-14611 (1986) has dielectric constants of 1,000–2,800, and these values are inferior to the dielectric constants of 3,000–3,500 of the conventional ceramic composition using a noble metal such as Pd. Therefore, it is difficult to produce ceramic capacitors with a large capacitance without an increase in volume.

Still further, the temperature change rate of a dielectric constant of this composition falls within a change rate of ±10% between −25° C. and +85° C. with respect to a dielectric constant at 20° C., but in a change rate of high temperature exceeding +85° C., the change rate exceeds 10% and greatly shifts from the X7R characteristics specific by EIA.

SUMMARY OF THE INVENTION

Therefore, the principal object of the present invention is to provide a nonreducing dielectric ceramic composition which is fired without becoming semiconductive even in a low oxygen partial pressure atmosphere, and has a dielectric constant not less than 3,000 and high insulation resistance, and further satisfies a temperature change rate of dielectric constant within ±15% with respect to a dielectric constant at 25° C. between −55° C. and +125° C.

This invention is a nonreducing dielectric ceramic composition that includes 100 mol % of main components which include $BaTiO_3$ containing alkali metal oxides as impurities in an amount less than 0.04% by weight, at least one kind of rare earth metal oxides ($Re_2O_3$) selected from $Tb_2O_3$, $Dy_2O_3$, $Ho_2O_3$ and $Er_2O_3$, and $Co_2O_3$ in the following ratios: $BaTiO_3$ 92.0–99.4 mol %, $Re_2O_3$ 0.3–4.0 mol %, and $Co_2O_3$ 0.3–4.0 mol %, and subcomponents which include 0.2–4.0 mol % of $BaO$, 0.2–3.0 mol % of $MnO$, 0.5–5.0 mol % of $MgO$.

Furthermore, in the above nonreducing dielectric ceramic composition, 0.5–2.5 weight parts of oxide glass containing $BaO$-$SrO$-$Li_2O$-$SiO_2$ may be incorporated based upon 100 weight parts for the above composition.

And, in the first nonreducing dielectric ceramic composition, 0.5–4.0 mol % $CaTiO_3$ may be incorporated therein as a subcomponent, and further, 0.5–2.5 weight parts of oxide glass containing $BaO$-$SrO$-$Li_2O$-$SiO_2$ may be incorporated based upon 100 weight parts for the above composition.

In the first nonreducing dielectric ceramic composition, $CaZrO_3$ of 0.5–3.5 mol % may be incorporated therein as a subcomponent, and further, 0.5–2.5 weight parts of oxide glass containing $BaO$-$SrO$-$Li_2O$-$SiO_2$ may be incorporated based upon 100 weight parts for the above composition.

Further, in the first nonreducing dielectric ceramic composition, 0.2–3.0 mol % $SiO_2$ as a subcomponent may be incorporated therein.

In the first nonreducing dielectric ceramic composition, one or both of $NiO$ and $Al_2O_3$ in an amount of 0.3–3.0 mol % as subcomponents may be incorporated therein.

And, in the first nonreducing dielectric ceramic composition, one or both of $NiO$ and $Al_2O_3$ in an amount of 0.3–3.0 mol % may be incorporated therein as a subcomponent and 0.5–2.5 weight parts of oxide glass containing $BaO$-$SrO$-$Li_2O$-$SiO_2$ may be incorporated therein based upon 100 weight parts for the above composition.

In the second nonreducing dielectric ceramic composition, 0.2–4.0 mol % $SrO$ may be included instead of $BaO$ in the amount of 0.2–4.0 mol %.

Further, in the second nonreducing dielectric ceramic composition, 0.2–4.0 mol % $SrO$ may be included instead of $BaO$ in the amount of 0.2–4.0 mol %.

When the nonreducing dielectric ceramic composition according to the invention is fired in a neutral or reducing atmosphere, the dielectric ceramic is not reduced to a semiconductive state. Moreover, this nonreducing dielectric ceramic composition has a high insulation resistance value and a high dielectric constant which is not less than 3,000, and its temperature change rate of capacitance satisfies the X7R characteristics specified by EIA.

Therefore, when using the nonreducing dielectric ceramic composition of the invention as a dielectric material for monolithic ceramic capacitors, a base metal such as Ni can be used for the internal electrode material. Thus, it is possible to reduce the manufacturing cost of monolithic ceramic capacitors without impairing their characteristics as compared with that of the conventional capacitors using a noble metal such as Pd as the internal electrode.

The above and further objects, features, aspects and advantages of the invention will more fully be apparent from the following detailed description of the embodiments.

DESCRIPTION OF THE PREFERRED EMBODIMENTS

Embodiment 1

Figure 1:
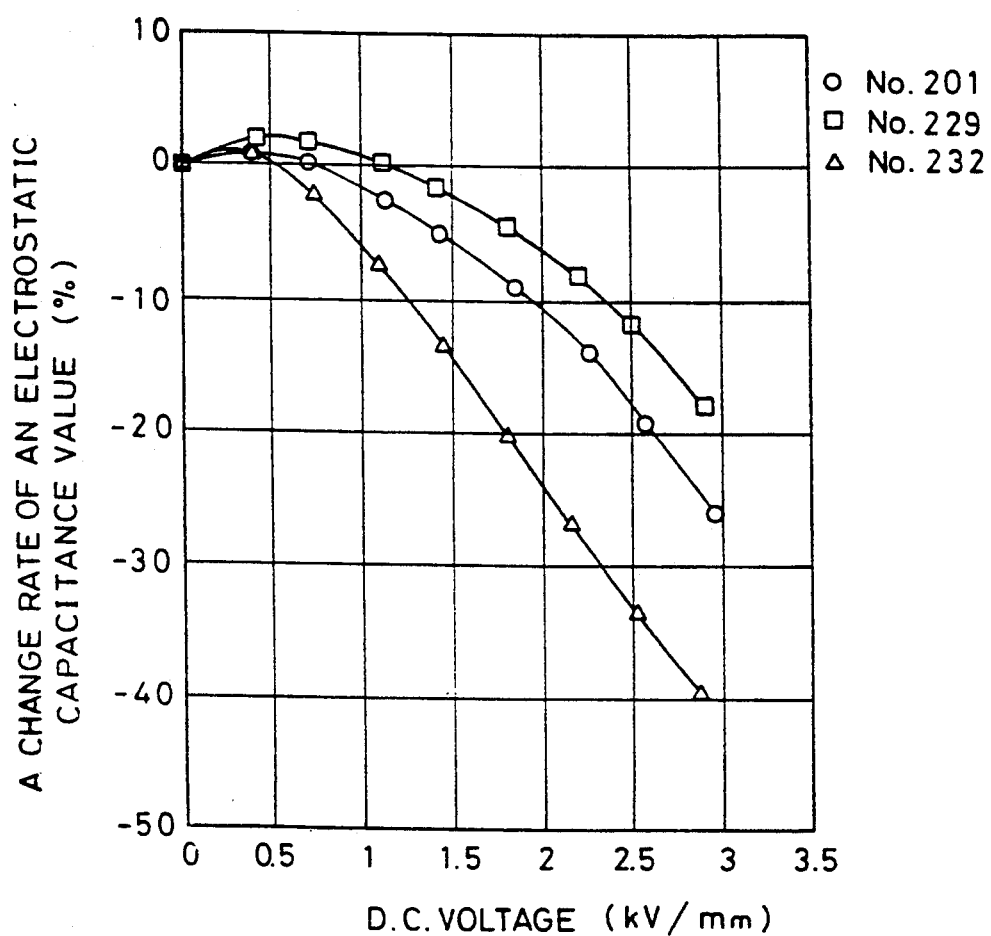
FIG. 1 is a graph showing a change rate of capacitance of Embodiment 3 when an applied d.c. electric field intensity is varied.

As starting materials, $BaTiO_3$ having different contents of alkali metal oxides as impurities, $BaCO_3$ for mol ratio correction of Ba to Ti, rare earth metal oxides, $Co_2O_3$, MnO, and MgO were prepared. These materials were weighed to prepare a mixture for the composition shown in Table 1. Further, for Samples No. 1-23, $BaTiO_3$ containing 0.03 weight % of alkali metal oxides was used, for example, for Sample No. 24, $BaTiO_3$ containing 0.05 weight % of alkali metal oxides was used, and for Sample No. 25, $BaTiO3$ having 0.07 weight % of alkali metal oxides was used.

Vinyl acetate binder in an amount of 5 weight % was added to the weighed mixed material, and then it was sufficiently wet-blended by a ball mill using PSZ balls. After evaporating the dispersion medium and drying the mixture, a powder of the mixture was obtained by a grading process. The powder thus obtained was compacted into a disk having a 10 mm diameter and a 1 mm thickness under a pressure of 2 ton/$cm^2$.

Then, the binder of the disk thus obtained was removed by holding it for 3 hours at 400° C. in air, and thereafter the disk was fired at the temperature shown in Table 2 for 2 hours in reducing atmospheric gas flow with a $H_2/N_2$ volume ratio of 3/100 to obtain a sintered ceramic disk.

The resultant sintered disk was coated with a silver paste on opposite sides and baked to obtain a ceramic capacitor. Dielectric constant (E), dielectric loss (tan δ), insulation resistance value (log IR), and temperature change rate of capacitance (TCC) were measured at room temperature. The results are shown in Table 2.

In addition, the dielectric constant (E), dielectric loss (tan δ) were measured at a temperature of 25° C., frequency of 1 kHz and an A.C. voltage of 1 V. The insulation resistance value was measured at 25° C., applying a D.C. voltage of 500 V for two minutes, and the results are shown in logarithmic values (log IR). Concerning the temperature change rate of capacitance (TCC), change rates at −55° C. and 125° C. were determined based on the capacitance value at 25° C. as a reference ($\Delta C_{-55}/C_{25}, \Delta C_{+125}/C_{25}$), and also an absolute value of the maximum value of the temperature change rate of capacitance between −55° C. and +125° C. was determined based on the capacitance at 25° C. as a reference ($|\Delta C/C_{25}|_{max}$).

As can be seen from Table 2, a nonreducing dielectric ceramic composition according to the invention has high resistance to reduction even when fired at a temperature within a range of 1,300°-1,360° C. in a neutral or reducing atmospheric gas. Still further, the ceramic obtained from this nonreducing dielectric ceramic composition has a high insulation resistance value, over 11.0 in log IR, and a high dielectric constant above 3,000, and its temperature change rate of capacitance satisfies the X7R characteristics specified by EIA.

The reason why the ranges of main components and subcomponents are defined in the present invention as mentioned above is as follows.

First, the reason that the ranges of the main components are as defined above will be explained.

If the main component $BaTiO_3$ is less than 92.0 mol % as in Sample No. 4, the insulation resistance value and dielectric constant are lowered. If the $BaTiO_3$ exceeds 99.4 mol % as in Sample No. 3, the effect of adding the rare earth metal oxide and $Co_2O_3$ is lost, and the temperature change rate of capacitance in a high temperature range (near Curie point) is greatly shifted toward a (+) side.

If the alkali metal oxides content in $BaTiO_3$ exceeds 0.04 weight % as in Samples No. 24 and No. 25, the dielectric constant is lowered.

Next, the reason that the ranges of subcomponents are as defined above will be explained.

If the BaO content is less than 0.2 mol % as in Sample No. 9, the composition is reduced during firing in a neutral or reducing atmospheric gas, and the insulation resistance value is lowered. If the BaO content exceeds 4.0 mol % as Sample No. 12, sinterability is lowered.

If the MnO content is less than 0.2 mol % as in Sample No. 17, there is no improvement of anti-reduction of the composition and the insulation resistance value is lowered. If the MnO exceeds 3.0 mol % as in Sample No. 15, the insulation resistance value is decreased.

If the MgO content is less than 0.5 mol % as in Sample No 18, there is no flattening of the temperature change rate of capacitance, causing a tendency to shift the rate toward a (−) side especially in a low temperature range, and also there is no improvement of the insulation resistance value. If the MgO exceeds 5.0 mol % as in Sample No. 23, the dielectric constant and insulation resistance value are lowered.

In addition, the characteristic data shown in Table 2 is obtained using disk type capacitors, but approximately the same data can be obtained using monolithic capacitors which are made by the same composition.

Embodiment 2

As starting materials, $BaTiO_3$ having different contents of alkali metal oxides as impurities, $BaCO_3$ for mol ratio correction of Ba to Ti, rare earth metal oxides, $Co_2O_3$, MnO, MgO, and oxide glass were prepared. These materials were weighed to prepare a mixture for the composition shown in Table 3. Further for samples 101-127, $BaTiO_3$ containing 0.03 weight % of alkali metal oxides was used, for Sample No. 128, $BaTiO_3$ containing 0.05 weight % of alkali metal oxides was used, and for Sample No 129, $BaTiO_3$ containing 0.07 weight % of alkali metal oxides was used.

Vinyl acetate binder in an amount of 5 weight % was added to the weighed mixed material, and then it was sufficiently wet-blended by a ball mill using PSZ balls. After evaporating the dispersion medium and drying the mixture, a powder of the mixture was obtained by a grading process. The powder thus obtained was compacted into a disk having a 10 mm diameter and a 1 mm thickness under a pressure of 2 ton/$cm^2$.

Then, the binder of the disk thus obtained was removed by holding it for 3 hours at 400° C. in air, and thereafter the disk was fired at the temperature shown in Table 4 for 2 hours, in a reducing atmospheric gas flow with a $H_2/N_2$ volume ratio of 3/100 to obtain a sintered ceramic disk.

The resultant sintered ceramic disk was coated with a silver paste on opposite sides and baked to obtain a ceramic capacitor. Dielectric constant ($\epsilon$), dielectric loss (tan $\delta$), insulation resistance value (log IR), and temperature change rate of capacitance (TCC) were measured at room temperature in the same condition as that of Embodiment 1. The results are shown in Table 4.

As can be seen from Table 4, a nonreducing dielectric ceramic composition according to the invention has high resistance to reduce even when fired at a temperature within a range of 1,260°-1,300° C. in a neutral or reducing atmospheric gas. Still further, the ceramic obtained from this nonreducing dielectric ceramic composition has a high insulation resistance value, over 12.0 in log IR, and a high dielectric constant, above 3,000, and its temperature change rate of capacitance satisfies the X7R characteristic specified by EIA.

The reason why the ranges of main components and subcomponents are defined as mentioned above in the present invention is as follows.

First, the reason that the ranges of the main components are defined as discussed will be explained.

If the main component $BaTiO_3$ content is less than 92.0 mol % as in Sample No. 104, the insulation resistance value and dielectric constant are lowered. If the $BaTiO_3$ content exceeds 99.4 mol % as in Sample No. 103, the effect of adding the rare earth metal oxide and $Co_2O_3$ in lost, and the temperature change range of capacitance in a high temperature range (near Curie point) is greatly shifted toward a (+) side.

If the alkali metal oxide content of the $BaTiO_3$ exceeds 0.04 weight % as in Samples No. 128 and No. 129, the dielectric constant is lowered.

Next, the reason that ranges of subcomponents are defined as discussed above will be explained.

If the BaO content is less than 0.2 mol % as in Sample No. 109, the composition is reduced during firing in a neutral or reducing atmospheric gas, and the insulation resistance value is lowered. If the BaO content exceeds 4.0 mole % as in Sample No. 112, sinterability is lowered.

If the MnO content is less than 0.2 mol % as in Sample No. 117, the improvement of anti-reduction of the composition and the insulation resistance value is lowered. If the MnO content exceeds 3.0 mol % as in Sample No. 115, the insulation resistance value is decreased.

If the MgO content is less than 0.5 mol % as in Samples No. 122 and No. 123, there is no flattening of the temperature change rate of capacitance, causing a tendency to shift the rate toward a (−) side, especially in a low temperature range, and there is no improvement of the insulation resistance value. If the MgO content exceeds 5.0 mol % as in Sample No. 127, the dielectric constant and insulation resistance value are lowered.

If the oxide glass content which contains $BaO$-$SrO$-$Li_2O$-$SiO_2$ is less than 0.5 weight % as in Sample No. 121, the effects of lowering the sintering temperature and improving the anti-reduction are lost. If the oxide glass content which contains $BaO$-$SrO$-$Li_2O$-$SiO_2$ is less than 5 weight % as in Sample No. 119, a decreased dielectric constant will result.

In addition, the characteristic data shown in Table 4 was obtained using disk type capacitors, but approximately the same data can be obtained using monolithic capacitors which are of the same composition.

Embodiment 3

As starting materials, $BaTiO_3$ having different contents of alkali metal oxides as impurities, $BaCO_3$ for mol ratio correction of Ba to Ti, rare earth metal oxides, $Co_2O_3$, MnO, MgO, $CaTiO_3$, and oxide glass were prepared. These materials were weighed to prepare a mixture for a composition shown in Table 5. Further, for Samples No. 201-232, $BaTiO_3$ containing 0.03 weight % of alkali metal oxides was used, for Sample No. 233, $BaTiO_3$ containing 0.05 weight % of alkali metal oxides was used, and for Sample No. 234, $BaTiO_3$ containing 0.07 weight % of alkali metal oxides was used.

Vinyl acetate binder in an amount of 5 weight % was added to the weighed mixed material, and then it was sufficiently wet balanced by a ball mill using PSZ balls. After evaporating the dispersion medium and drying the mixture, the powder of the mixture was obtained by a grading process. The powder thus obtained was compacted into a disk having a 10 mm diameter and a 1 mm thickness under a pressure of 2 ton/cm².

Then, the binder of the disk thus obtained was removed by holding it at 400° C. for 3 hours in air, and thereafter the disk was fired at the temperature shown in Table 6 for 2 hours, in a reducing atmospheric gas flow with a $H_2/N_2$ volume ratio of 3/100 to obtain a sintered ceramic disk.

The resultant sintered ceramic disk was coated with a silver paste on opposite sides and baked to obtain a ceramic capacitor. A dielectric constant ($\epsilon$), dielectric loss (tan $\delta$), insulation resistance value (log IR), and a temperature change rate of capacitance (TCC) were measured at room temperature in the same condition as that of Embodiment 1. Further, a D.C. bias characteristic is expressed by a change rate of an electrostatic capacitance value when a D.C. voltage is applied so as to form an electric field intensity of 2.0 (KV/mm) versus an electrostatic capacitance value when no voltage is applied.

And FIG. 1 is a graph showing a change rate of capacitance of the embodiments and examples for comparison when applied D.C. electric field intensity was varied.

As can be seen from Table 6 and FIG. 1, a nonreducing dielectric ceramic composition according to the invention has high resistance to reduction even when fired at a temperature within a range of 1,260°-1,300° C. in a neutral or reducing atmospheric gas. Still further, the ceramic obtained from this nonreducing dielectric ceramic composition shows a high insulation resistance value, over 12.0 in log IR, and a high dielectric constant, above 3,000, and its temperature change rate of capacitance satisfies the X7R characteristics specified by EIA, and the composition also has superior D.C. bias characteristics.

The reason why the ranges of main components and subcomponents are defined as mentioned above in the present invention as is follows.

First, the reason that the ranges of the main components are as defined above will be explained.

If the main component $BaTiO_3$ component is less than 92.0 mol % as in Sample No. 204, the insulation resistance value and dielectric constant is low. If the content of $BaTiO_3$ exceeds 99.4 mol %, the effect of adding the rare earth metal oxide and $Co_2O_3$ is lost, and the temperature change rate of capacitance in a high temperature range (near Curie point) is greatly shifted toward a (+) side.

If the alkali metal oxides content in the BaTiO$_3$ exceeds 0.04 weight % as in Samples No. 233 and No. 234, the dielectric constant is lowered.

Next, the reason that the ranges of subcomponents are defined above will be explained.

If the BaO content is less than 0.2 mol % as in Sample No. 209, the composition is reduced during firing in a neutral or reducing atmospheric gas, and the insulation resistance value is lowered. If the BaO content exceeds 4.0 mol % as in Sample No. 212, sinterability is lowered.

If the MnO content is less than 0.2 mol % as in Sample No. 217, there is no improvement in anti-reduction of composition and insulation resistance value is lowered. If the MnO content exceeds 3.0 mol % as in Sample No. 215, the insulation resistance value is decreased.

If the MgO content is less than 0.5 mol % as in Samples No. 222 and No. 223, a curve of the temperature change rate of capacitance tends to go single-peaked and to shift to a (−) side in a low temperature range and to a (+) side in a high temperature range (near Curie point), and improvement of insulation resistance is low. If the MgO content exceeds 5.0 mol % as in Sample No. 227, the dielectric constant and insulation resistance value is lowered.

If the CaTiO$_3$ content is less than 0.5 mol % as in Sample No. 232, improvement of the D.C. bias characteristic is lost and dependence on applied voltage of electrostatic capacitance is increased. If the CaTiO$_3$ content exceeds 4.0 mol % as in Sample No. 230, the temperature change rate of capacitance in a high temperature range tends to shift to a (−) side and the dielectric constant becomes lower.

If the oxide glass content that contains BaO-SrO-Li$_2$O-SiO$_2$ is less than 0.5 weight % as in Sample No. 221, the effects of lowered sintering temperature and improved anti-reduction are lost. If the oxide glass content that contains BaO-SrO-Li$_2$O-SiO$_2$ exceeds 2.5 weight % as in Sample No. 219, the dielectric constant is decreased.

In addition, the characteristic data shown in Table 6 is obtained using disk type capacitors, but approximately the same data can be obtained using monolithic capacitors having the same composition.

Embodiment 4

As starting materials, BaTiO$_3$ having different contents of alkali metal oxides as impurities, rare earth metal oxides, BaCO$_3$, MnO, MgO, CaZrO$_3$, and oxide glass were prepared. These materials were weighed to prepared a mixture for a composition shown in Table 7. Further, for Samples No. 301-332, BaTiO$_3$ containing 0.03 weight % was used, for Sample No. 333, BaTiO$_3$ containing 0.05 weight % of alkali metal oxides was used, and for Sample No. 334, BaTiO$_3$ containing 0.07 weight % of alkali metal oxides was used.

The weighed materials thus obtained were mixed with a dispersion medium by a ball mill using PSZ balls to make a slurry. Then, an organic binder and plasticizer were added to the slurry and these were sufficiently agitated and then formed in to a sheet by the doctor blade method to obtain a ceramic green sheet.

Then, on one face of the ceramic green sheet thus obtained, conductive paste for forming internal electrodes was printed and dried, and then a plurality of the green sheets were laminated and pressed in the direction of the thickness to obtain a stacked body. The binder of the stacked body was removed by holding it at 320° C. for 5 hours in air and thereafter the stacked body was fired at the temperature shown in Table 8 for 2 hours in a reducing atmospheric gas flow with a H$_2$/N$_2$ volume ratio of 3/100 to obtain a sintered ceramic body.

The resultant sintered ceramic body was coated with a silver paste on opposite sides and baked to obtain a ceramic capacitor. A dielectric constant ($\epsilon$), dielectric loss (tan $\delta$), insulation resistance value (log IR) and a temperature change rate of capacitance (TCC) were measured at room temperature in the same condition as that of the Embodiment 1. Further, a mean time to failure (MTTF) of the capacitor was measured. The results are shown in Table 8.

In addition, the MTTF was calculated in such a way that taking a number of samples n=18, and applying an electric field intensity of 10.0 KV/mm to the samples at an ambient temperature of 150° C. and counting time to dielectric breakdown.

As can be seen from Table 8, a nonreducing dielectric ceramic composition according to the invention has high resistance to reduction even when fired at a temperature within a range of 1,260°-1,300° C. in a neutral or reducing atmospheric gas. Still further, the ceramic obtained from this nonreducing dielectric ceramic composition has a value, 4,000 or more, of a product of an insulation resistance value and an electrostatic capacitance value (RC product) and a high dielectric constant, more than 3,000, and its temperature change rate of capacitance satisfies the X7R characteristics specified by EIA, and the MTTF is 500 hours or more when an electric field intensity of 10.0 KV/mm is applied with super acceleration at an ambient temperature of 150° C.

The reason why the ranges of main components and subcomponents are defined as mentioned above in the present invention is as follows.

First, the reason that the ranges of the main component are as defined above will be explained.

If the main component BaTiO$_3$ content is less than 92.0 mol % as in Sample No. 304, the insulation resistance value and dielectric constant is lowered. If the BaTiO$_3$ content exceeds 99.4 mol % as in Sample No. 303, the effect of adding the rare earth metal oxide and Co$_2$O$_3$ is lost, and the temperature change rate of capacitance in a high temperature range (near Curie point) is greatly shifted toward a (+) side.

If the alkali metal oxide content in the BaTi$_3$ exceeds 0.04 weight % as in Samples No. 333 and No. 334, the dielectric constant is lowered.

Next, the reason that the ranges of subcomponents are as defined above will be explained.

If the BaO content is less than 0.2 mol % as in Sample No. 309, the composition is reduced during firing in a neutral or reducing atmospheric gas, and the insulation resistance value is lowered. If the BaO content exceeds 4.0 mol % as in Sample No. 312, sinterability is lowered.

If the MnO content is less than 0.2 mol % as in Sample No. 317, there is no improvement of anti-reduction of the composition and the insulation resistance value is lowered. If the MnO content exceeds 3.0 mol % as in Sample No. 315, the insulation resistance value is decreased.

If the MgO content is less than 0.5 mol % as in Samples No. 322 and No. 323, a curve of the temperature change rate of capacitance tends to show a single peak and to shift to a (−) side in a low temperature range and to a (+) side in a high temperature range (near Curie point), and improvement of insulation resistance is lost. If the MgO content exceeds 5.0 mol % as in Sample No.

326, the dielectric constant and insulation resistance value is lowered.

If the $CaZrO_3$ content is less than 0.5 mol % as in Samples No. 331 and No. 332, there is no improvement of MTTF. The $CaZrO_3$ content exceeds 3.5 mol % as in Sample No. 329, the temperature change rate of capacitance in a high temperature range (near Curie point) tends to shift to a (−) side and the dielectric constant is lowered.

If the oxide glass content that contains $BaO-SrO-Li_2O-SiO_2$ ia less than 0.5 weight % as in Sample No. 321, the effects of lowering the sintering temperature and improving anti-reduction are lost. If the oxide glass content that contains $BaO-SrO-Li_2O-SiO_2$ exceeds 2.5 weight % as in Sample No. 319, the dielectric constant is decreased.

In addition, the characteristic data shown in Table 8 is obtained using disk type capacitors, but approximately the same data can be obtained using monolithic capacitors which are made by the same composition.

Embodiment 5

As starting materials, $BaTiO_3$ having different contents of alkali metal oxides as impurities, $BaCO_3$ for mol ratio correction of Ba to Ti, rare earth metal oxides, $Co_2O_3$, MnO, $SiO_2$, MgO were prepared. These materials were weighed to prepare a mixture for a composition shown in Tale 9. Further, for samples No. 401–429, $BaTiO_3$ containing 0.03 weight % of alkali metal oxides was used, for Sample No. 430, $BaTiO_3$ containing 0.05 weight % of alkali metal oxides was used, and for Sample No. 431, $BaTiO_3$ containing 0.07 weight % of alkali metal oxides was used.

Vinyl acetate binder in an amount of 5 weight % was added to the weighed mixed material and then it was sufficiently wet-blended by a ball mill using PSZ balls. After evaporating the dispersion medium and drying the mixture, the powder of the mixture was obtained by a grading process. The powder thus obtained was compacted into a disk having a 10 mm diameter and a 1 mm thickness under a pressure of 2 ton/cm$^2$.

Then, the binder of the disk thus obtained was removed by holding it for 3 hours at 400° C. in air, and thereafter the disk was fired at the temperature shown in Table 10 for 2 hours in a reducing atmospheric gas flown with a $H_2/N_2$ volume ratio of 3/100 to obtain a sintered ceramic disk.

The resultant sintered ceramic disk was coated with a silver paste on opposite sides and baked to obtain a ceramic capacitor. Dielectric constant ($\epsilon$), dielectric loss (tan $\delta$), insulation resistance value (log IR), and temperature change rate of capacitance (TCC) were measured at room temperature. The results are shown in Table 10.

As can be seen from Table 10, a nonreducing dielectric ceramic composition according to the invention has high resistance to reduction even when fired at a temperature within a range of 1,260°–1,300° C. in a neutral or reducing atmospheric gas. Still further, the ceramic obtained from this nonreducing dielectric ceramic composition has a high insulation resistance value, over 11.0 in log IR, and a high dielectric constant, above 3,000, and its temperature change rate of capacitance satisfies the X7R characteristics specified by EIA.

The reason why the ranges of main components and subcomponents are defined as mentioned above in the present invention is as follows.

First, the reason that the ranges of the main components are defined as discussed above will be explained.

If the main component $BaTiO_3$ content is less than 92.0 mol % as in Sample No. 404, the insulation resistance value and dielectric constant are lowered. If the content of $BaTiO_3$ exceeds 99.4 mol % as in Sample No. 403, the effect of adding the rare earth metal oxide and $Co_2O_3$ is lost, and the temperature change rate of capacitance in a high temperature range (near Curie point) is greatly shifted toward a (+) side.

If the alkali metal oxides in the $BaTiO_3$ exceeds 0.04 mol % as in Samples No. 430 and No. 431, the dielectric constant is lowered.

Next, the reason that the ranges of the subcomponents are as defined above will be explained.

If the BaO content is less than 0.2 mol % as in Sample No. 409, the composition is reduced during firing in a neutral or reducing atmospheric gas, and the insulation resistance value is lowered. If the BaO content exceeds 4.0 mol % as in Sample No. 412, sinterability is lowered.

If the MnO content is less than 0.2 mol % as in Sample No. 417, there is no improvement of anti-reduction of the composition and the insulation resistance value is lowered. If the MnO exceeds 3.0 mol % as in Sample No. 415, the insulation resistance value is decreased.

In the $SiO_2$ content is less than 0.2 mol % as in Sample No. 423, the sintering temperature is not lowered. If the $SiO_2$ content exceeds 5.0 mol % as in Sample No. 420, the dielectric constant is lowered.

If the MgO content is less than 0.5 mol % as in Sample No. 424, there is no flattening of the temperature change rate of capacitance, causing a tendency to shift the rate toward a (−) side, especially, in a low temperature range, and also there is no improvement of the insulation resistance value. If the MgO content exceeds 5.0 mol % as in Sample No. 429, the dielectric constant and insulation resistance value are lowered.

In addition, the characteristic data shown in Table 10 is obtained using disk type capacitors, but approximately the same data can be obtained using monolithic capacitors which are made by the same composition.

Embodiment 6

As starting materials, $BaTiO_3$ having different contents of alkali metal oxides as impurities, rare earth metal oxides, $Co_2O_3$, MnO, NiO, $Al_2O_3$, and MgO were prepared. These materials were weighed to prepare a mixture of the composition shown in Table 11. Further, for Samples No. 501–529, $BaTiO_3$ containing 0.03 weight % of alkali metal oxides was used, for Sample No. 530, $BaTiO_3$ containing 0.05 weight % of alkali metal oxides was used, and for Sample No. 531, $BaTiO_3$ containing 0.07 weight % of alkali metal oxides was used.

Vinyl acetate binder in an amount of 5 weight % was added to the weighed mixed material, and then it was sufficiently wet-blended by a ball mill using PSZ balls. After evaporating the dispersion medium and drying the mixture, a powder of the mixture was obtained by a grading process. The powder thus obtained was compacted into a disk having a 10 mm diameter and a 1 mm thickness under a pressure of 2 ton/cm$^2$.

Then, the binder of the disk thus obtained was removed by holding it at 400° C. for 3 hours in air, and thereafter the disk was fired at the temperature shown in Table 12 for 2 hours in a reducing atmospheric gas flow with a $H_2/N_2$ volume ratio of 3/100 to obtain a sintered ceramic disk.

The resultant sintered ceramic disk was coated with a silver paste on opposite sides and baked to obtain a ceramic capacitor. A dielectric constant ($\epsilon$), dielectric loss (tan $\delta$), insulation resistance value (log IR), and a temperature change rate of capacitance (TCC) were measured at room temperature in the same condition as that of Embodiment 1. The results are shown in Table 12.

As can be seen from Table 12, a nonreducing dielectric ceramic composition according to the invention has high resistance to reduction even when fired at a temperature within a range of 1,300°–1,360° C. in a neutral or reducing atmospheric gas. Still further, the ceramic obtained from this nonreducing dielectric composition has a high insulation resistance value, over 11.0 in log IR at room temperature and a small decline of it at a high temperature, and a high dielectric constant, above 3,000, and its temperature change rate of capacitance satisfies the X7R characteristics specified by EIA.

The reason why the ranges of main components and subcomponents are defined as mentioned above in the present invention is as follows.

First, the reasons that the ranges of the main component are as defined above will be explained.

If the main component $BaTiO_3$ content is less than 92.0 mole % as in Sample No. 504, the insulation resistance value and dielectric constant become lower. If the $BaTiO_3$ content exceeds 99.4 mol % as in Sample No. 503, the effect of adding the rare earth metal oxide and $Co_2O_3$ is lost, and the temperature change rate of capacitance in a high temperature range (near Curie point) is greatly shifted toward a (+) side.

If the alkali metal oxides content is the $BaTiO_3$ exceeds 0.04% as in Samples No. 530 and No. 531, the dielectric constant is lowered.

Next, the reason that the ranges of subcomponents are as defined above will be explained.

In the BaO content is less than 0.2 mol % as in Sample No. 509, the composition is reduced during firing in a neutral or reducing atmospheric gas, and the insulation resistance value is lowered. If the BaO content exceeds 4.0 mol % as in Sample No. 512, sinterability is lowered.

If the MnO content is less than 0.2 mol % as in Sample No. 517, there is no improvement in anti-reduction of the composition and the insulation resistance value is lowered. If the MnO exceeds 2.0 mol % as in Sample No. 515, the insulation resistance value, especially one in a high temperature range is decreased.

If the MgO content is less than 0.5 mol % as in Samples No. 524 and No. 525, there is no effect on flattening a curve of the temperature change rate of capacitance, causing a tendency to shift the curve to a (−) side especially in a low temperature range, and improvement of insulation resistance value is lost. If the MgO content exceeds 5.0 mol % as in Sample No. 529, the dielectric constant and insulation resistance value are lowered.

If the NiO or $Al_2O_3$ content is less than 0.3 mol % as in Sample No. 518, there is no improvement of anti-reduction of the composition and lowering insulation resistance value and there is no improvement of IR value at high temperature. If the NiO content exceeds 3.0 mol % as in Sample No. 521, insulation resistance value is decreased. If the $Al_2O_3$ content exceeds 3.0 mol % as in Sample No. 522, sinterability and dielectric constant are reduced, and dielectric loss is increased.

In addition, the characteristic data shown in Table 12 are ones obtained using disk type capacitors, but approximately the same data can be obtained using monolithic capacitors which are made by the same composition.

Embodiment 7

As starting materials, $BaTiO_3$ having different contents of alkali metal oxides as impurities, rare earth metal oxides, $Co_2O_3$, MnO, NiO, $Al_2O_3$, MgO and oxide glass were prepared. These materials were weighed to prepare a mixture for the composition shown in Table 13. Further, for Samples No. 601–632, $BaTiO_3$ containing 0.03 weight % of alkali metal oxides was used, for Sample No. 633, $BaTiO_3$ containing 0.05 weight % of alkali metal oxides was used, and for Sample No. 634, $BaTiO_3$ containing 0.07 weight % of alkali metal oxides was used.

Vinyl acetate binder in an amount of 5 weight % was added to the weighed mixed material, and then it was sufficiently wet-blended by a ball mill using PSZ balls. After evaporating the dispersion medium and drying the mixture, a powder of the mixture was obtained by a grading process. The powder thus obtained was compacted into a disk having a 10 mm diameter and a 1 mm thickness under a pressure of 2 ton/cm$^2$.

Then, the binder of the disk thus obtained was removed by holding it at 400° C. for 3 hours in air, and thereafter the disk was fired at the temperature shown in Table 14 for 2 hours in a reducing atmospheric gas flow with a $H_2/N_2$ volume ratio of 3/100 to obtain a sintered ceramic disk.

The resultant sintered ceramic disk was coated with a silver paste on opposite sides and baked to obtain a ceramic capacitor. Dielectric constant ($\epsilon$), dielectric loss (tan $\delta$), insulation resistance value (log IR), and a temperature change rate of capacitance (TCC) were measured at room temperature in the same condition as that of Embodiment 1. The results are shown in Table 14.

As can be seen from Table 14, a nonreducing dielectric ceramic composition according to the invention has high resistance to reduction even when fired at a temperature within a range of 1,230°–1,280° C. in a neutral or reducing atmospheric gas. Still furthermore, the ceramic obtained from this nonreducing dielectric ceramic composition has a high insulation resistance value, over 12.0 in log IR at room temperature and a small decline of it at a high temperature, and a high dielectric constant, above 3,000, and its temperature change rate of capacitance satisfies the X7R characteristics specified by EIA.

The reason why the ranges of main components and subcomponents are defined as mentioned above in the present invention as follows.

First, the reason that the ranges of the main components are as defined above will be explained.

If the main component $BaTiO_3$ content is less than 92.0 mol % as in Sample No. 604, the insulation resistance value and dielectric constant become lower. If the $BaTiO_3$ content exceeds 99.4 mol % as in Sample No. 603, the effect of adding the rare earth metal oxide and $Co_2O_3$ is lost, and the temperature change rate of capacitance in a high temperature range (near Curie point) is greatly shifted toward a (+) side.

If the alkali metal oxides content in the $BaTiO_3$ exceeds 0.04 weight % as in Samples No. 633 and No. 634, the dielectric constant is lowered.

Next, the reason that the ranges of subcomponents are as defined above will be explained.

If the BaO content is less than 0.2 mol % as in Sample No. 609, the composition is reduced during firing in a neutral or reducing atmospheric gas, and the insulation resistance value is lowered. If the BaO content exceeds 4.0 mol % as in Sample No. 612, sinterability is lowered.

If the MnO content is less than 0.2 mol % as in Sample No. 617, there is no improvement of anti-reduction of the composition and the insulation resistance value is lowered. If the MnO content exceeds 2.0 mol % as in Sample No. 615, the insulation resistance value, especially one in a high temperature range, is decreased.

If the MgO content is less than 0.5 mol % as in Samples No. 627 and No. 628, there is no effect on flattening a curve of the temperature change rate of capacitance, causing a tendency to shift the curve to a (−) side, especially in a low temperature range, and improvement of the insulation resistance value is lost. If the MgO content exceeds 5.0 mol % as in Sample No. 632, insulation resistance value is lowered.

If the NiO or $Al_2O_3$ content is less than 0.3 mol % as in Sample No. 618, there is no improvement of anti-reduction of the composition, the insulation resistance value is decreased and there is no improvement of IR value at high temperature. If the NiO content exceeds 3.0 mol % as in Sample No. 621, insulation resistance value is decreased. If the $Al_2O_3$ content exceeds 3.0 mol % as in Sample No. 622, sinterability and dielectric constant are decreased and dielectric loss is increased.

If the oxide glass content that contains $BaO$-$SrO$-$Li_2O$-$SiO_2$ is less than 0.5 weight % as in Sample No. 626, the lowering of sintering temperature and improvement of anti-reduction are lost. If the oxide glass content that contains $BaO$-$SrO$-$Li_2O$-$SiO_2$ exceeds 2.5 weight % as in Sample No. 624, the dielectric constant is decreased.

In addition, the characteristic data shown in Table 14 is obtained using disk type capacitors, but approximately the same data can be obtained using monolithic capacitors which are made by the same composition.

Embodiment 8

As starting materials, $BaTiO_3$ having different contents of alkali metal oxides as impurities, $CaCO_3$ for mol ratio correction of Ba to Ti, rare earth metal oxides, $Co_2O_3$, MnO, MgO and oxide glass were prepared. These materials were weighed to prepare a mixture for the composition shown in Table 15. Further, for Samples No. 701-727, $BaTiO_3$ containing 0.03 weight % of alkali metal oxides was used, for Sample No. 728, $BaTiO_3$ containing 0.05 weight % of alkali metal oxides was used, and for Sample No. 727, $BaTiO_3$ containing 0.07 weight % of alkali metal oxides was used.

Vinyl acetate binder in an amount of 5 weight % was added to the weighed mixed material, and then it was sufficiently wet-blended by a ball mill using PSZ balls. After evaporating the dispersion medium and drying the mixture, a powder of the mixture was obtained by a grading process. The powder thus obtained was compacted into a disk having a 10 mm diameter and a 1 mm thickness under a press of 2 ton/cm².

Then the binder of the disk thus obtained was removed by holding it at 400° C. for 3 hours in air, and thereafter the disk was fired at the temperature shown in Table 16 for 2 hours in a reducing atmospheric gas flow with a $H_2/N_2$ volume ratio of 3/100 to obtain a sintered ceramic disk.

The resultant sintered ceramic disk was coated with a silver paste on opposite sides and baked to obtain a ceramic capacitor. Dielectric constant ($\epsilon$), dielectric loss (tan $\delta$), insulation resistance value (log IR), and temperature change rate of capacitance (TCC) were measured at room temperature in the same condition as that of Embodiment 1. The results are shown in Table 16.

As can be seen from Table 16, a nonreducing dielectric ceramic composition according to the invention has high resistance to reduction even when fired at a temperature within a range of 1,260°-1,300° C. in a neutral or reducing atmospheric gas. Still further, the ceramic obtained from this nonreducing dielectric ceramic composition has a high insulation resistance value over 12.0 in log IR, and a high dielectric constant above 3,000, and its temperature change rate of capacitance satisfies the X7R characteristics specified by EIA.

The reason why the ranges of main components and subcomponents are defined as mentioned above in the present invention is as follows.

First, the reason that the ranges of the main components are as defined above will be explained.

If the main component $BaTiO_3$ content is less than 92.0 mol % as in Sample No. 704, the insulation resistance value and dielectric constant are lowered. If the $BaTiO_3$ content exceeds 99.4 mol % as in Sample No. 703, the effect of adding rare earth metal oxide and $Co_2O_3$ is lost, and the temperature change rate of capacitance in a high temperature range (near Curie point) is greatly shifted towards a (+) side.

If the alkali metal oxides content in the $BaTiO_3$ exceeds 0.04 weight % as in Samples No. 728 and No. 729, the dielectric constant is lowered.

Next, the reason that the ranges of subcomponents are as defined above will be explained.

If the CaO content is less than 0.2 mol % as in Sample No. 729, the composition is reduced during firing in a neutral or reducing atmospheric gas, and the insulation resistance value is lowered. If the CaO content exceeds 4.0 mol % as Sample No. 712, sinterability is lowered.

If the MnO is less than 0.2 mol % as in Sample No. 717, there is no improvement of anti-reduction of the composition and the insulation resistance value is lowered. If the MnO content exceeds 3.0 mol % as in Sample No. 715, the insulation resistance value is decreased.

If the MgO content is less than 0.5 mol % as in Samples No. 722 and No. 723, there is no effect on flattening a curve of the temperature change rate of capacitance, causing a tendency to shift the curve to a (−) side, especially in a low temperature range, and improvement of insulation resistance value is lost. If the MgO content exceeds 5.0 mol % as in Sample No. 727, the dielectric constant and the insulation resistance value are lowered.

If the oxide glass content that contains $BaO$-$SrO$-$Li_2O$-$SiO_2$ is less than 0.5 weight % as in Sample No. 721, the effect of lowering the sintering temperature and improving anti-reduction are lost. If the oxide glass content that contains $BaO$-$SrO$-$Li_2O$-$SiO_2$ exceeds 2.5 weight % as in Sample No. 719, the dielectric constant is decreased.

In addition, the characteristic data shown in Table 16 is obtained using disk type capacitors, but approximately the same data can be obtained using monolithic capacitors which are made by the same composition.

Embodiment 9

As starting materials, $BaTiO_3$ having different contents of alkali metal oxides as impurities, $SrCO_3$ for mol ratio correction of Ba to Ti, rare earth metal oxides, $Co_2O_3$, MnO, MgO and oxide glass were prepared. These materials were weighed to prepare a mixture for the composition shown in Table 17. Further, for Samples No. 801-827, $BaTiO_3$ containing 0.03 weight % of alkali metal oxides were used, for Sample No. 828, $BaTiO_3$ containing 0.05 weight % of alkali metal oxides was used, and for Sample No. 829, $BaTiO_3$ containing 0.07 weight % of alkali metal oxides was used.

Vinyl acetate binder in an amount of 5 weight % was added to the weighed mixed material, and then it was sufficiently wet-blended by a ball mill using PSZ balls. After evaporating the dispersion medium and drying the mixture, a powder of the mixture was obtained by a grading process. The powder thus obtained was compacted into a disk having a 10 mm diameter and a 1 mm thickness under a pressure of 2 ton/cm$^2$.

Then, the binder of the disk thus obtained was removed by holding it at 400° C. for 3 hours in the air, and thereafter the disk was fired at the temperature shown in Table 18 for 2 hours in a reducing atmospheric gas flow with a $H_2/N_2$ volume ratio of 3/100 to obtain a sintered ceramic disk.

The resultant sintered ceramic disk was coated with a silver paste on opposite sides and baked to obtain a ceramic capacitor. A dielectric constant ($\epsilon$), dielectric loss (tan $\delta$), insulation resistance value (log IR), and a temperature change rate of capacitance (TCC) were measured at room temperature in the same condition as that of Embodiment 1. The results are shown in Table 18.

As can be seen from Table 18, a nonreducing dielectric ceramic composition according to the invention has high resistance to reduction even when fired at a temperature within a range of 1,260°-1,300° C. in a neutral or reducing atmospheric gas. Still further, the ceramic obtained from this nonreducing dielectric ceramic composition has a high insulation resistance value, over 12.0 in log IR, and a high dielectric constant, above 3,000, and its temperature change rate of capacitance satisfies the X7R characteristics specified by EIA.

The reason why the ranges of main components and subcomponents are defined as mentioned above in the present invention is as follows.

First, the reason that the ranges of the main components are as defined above will be explained.

If the main component $BaTiO_3$ content is less than 92.0 mol % as in Sample No. 804, the insulation resistance value and dielectric constant are lowered. If the $BaTiO_3$ content exceeds 99.4 mol % as in Sample No. 803, the effect of adding the rare earth metal oxide and $Co_2O_3$ is lost, and the temperature change rate of capacitance is a high temperature range (near Curie point) is greatly shifted toward a (+) side.

If the alkali metal oxides content in the $BaTiO_3$ exceeds 0.04 weight % as in Samples No. 828 and No. 829, the dielectric constant is lowered.

Next, the reason that the ranges of subcomponents are as defined above will be explained.

If the SrO content is less than 0.2 Mol % as in Sample No. 809, the composition is reduced during firing in the neutral or reducing atmospheric gas, and the insulation resistance value is lowered. If the SrO exceeds 4.0 mol % as in Sample No. 812, sinterability is lowered.

If the MnO content is less than 0.2 mol % as in Sample No. 817, there is no improvement of anti-reduction of the composition and the insulation resistance value is lowered. If the MnO content exceeds 3.0 mol % as in Sample No. 815, the insulation resistance value is decreased.

If the MgO content is less than 0.5 mol % as in Samples No. 822 and No. 823, there is no effect on flattening a curve of the temperature change rate of capacitance causing a tendency to shift to a (−) side, especially in a low temperature range, and improvement of insulation resistance value is lost. If the MgO content exceeds 5.0 mol % as in Sample No. 827, the dielectric constant and the insulation resistance value are lowered.

In the oxide glass content that contains BaO-SrO-$Li_2O$-$SiO_2$ is less than 0.5 weight % as in Sample No. 821, the effects of lowering a sintering temperature and improving anti-reduction are lost. If the oxide glass content that contains BaO-SrO-$Li_2O$-$SiO_2$ exceeds 2.5 weight % as in Sample No. 819, the dielectric constant is reduced.

In addition, the characteristic data shown in Table 16 in obtained using disk type capacitors, but approximately the same data can be obtained using monolithic capacitors which are made by the same composition.

TABLE 1

| SAMPLE No. | $BaTiO_3$ (mol %) | $Re_2O_3$ (mol %) | | $CO_2O_3$ (mol %) | BaO (mol %) | MnO (mol %) | MgO (mol %) |
| --- | --- | --- | --- | --- | --- | --- | --- |
| 1 | 97.0 | $Dy_2O_3$ | 1.5 | 1.5 | 1.5 | 1.0 | 1.0 |
| 2 | 99.0 | $Dy_2O_3$ | 0.5 | 0.5 | 1.5 | 1.0 | 1.0 |
| 3* | 99.6 | $Dy_2O_3$ | 0.2 | 0.2 | 1.5 | 1.0 | 1.0 |
| 4* | 90.0 | $Dy_2O_3$ | 5.0 | 5.0 | 1.5 | 1.0 | 1.0 |
| 5 | 93.0 | $Dy_2O_3$ | 3.0 | 4.0 | 1.5 | 1.0 | 1.0 |
| 6 | 97.5 | $Ho_2O_3$ | 1.5 | 1.0 | 2.0 | 1.0 | 2.0 |
| 7 | 96.5 | $Ho_2O_3$ | 1.5 | 2.0 | 0.5 | 1.5 | 2.0 |
| 8 | 96.5 | $Ho_2O_3$ | 1.5 | 2.0 | 0.3 | 1.5 | 2.0 |
| 9* | 96.5 | $Ho_2O_3$ | 1.5 | 2.0 | 0.1 | 1.5 | 2.0 |
| 10 | 96.5 | $Ho_2O_3$ | 1.5 | 2.0 | 3.0 | 1.5 | 2.0 |
| 11 | 96.5 | $Ho_2O_3$ | 1.5 | 2.0 | 4.0 | 1.5 | 2.0 |
| 12* | 96.5 | $Ho_2O_3$ | 1.5 | 20 | 5.0 | 1.5 | 2.0 |
| 13 | 97.5 | $Tb_2O_3$ | 1.0 | 1.5 | 1.5 | 2.5 | 3.0 |
| 14 | 97.5 | $Tb_2O_3$ | 1.0 | 1.5 | 1.5 | 3.0 | 3.0 |
| 15* | 97.5 | $Tb_2O_3$ | 1.0 | 1.5 | 1.5 | 3.5 | 3.0 |
| 16 | 97.5 | $Tb_2O_3$ | 1.0 | 1.5 | 1.5 | 0.3 | 3.0 |
| 17* | 97.5 | $Tb_2O_3$ | 1.0 | 1.5 | 1.5 | 0.1 | 3.0 |
| 18* | 96.0 | $Er_2O_3$ | 1.5 | 2.5 | 1.5 | 1.0 | 0.4 |
| 19 | 96.0 | $Er_2O_3$ | 1.5 | 2.5 | 1.5 | 1.0 | 0.6 |
| 20 | 96.0 | $Er_2O_3$ | 1.5 | 2.5 | 1.5 | 1.0 | 3.0 |
| 21 | 96.0 | $Er_2O_3$ | 1.5 | 2.5 | 1.5 | 1.0 | 4.0 |
| 22 | 96.0 | $Er_2O_3$ | 1.5 | 2.5 | 1.5 | 1.0 | 5.0 |
| 23* | 96.0 | $Er_2O_3$ | 1.5 | 2.5 | 1.5 | 1.0 | 6.0 |
| 24* | 96.0 | $Dy_2O_3$ | 1.5 | 2.5 | 1.5 | 1.0 | 1.0 |

TABLE 1-continued

| SAMPLE No. | BaTiO$_3$ (mol %) | Re$_2$O$_3$ (mol %) | CO$_2$O$_3$ (mol %) | BaO (mol %) | MnO (mol %) | MgO (mol %) |
|---|---|---|---|---|---|---|
| 25* | 96.0 | Dy$_2$O$_3$ 1.5 | 2.5 | 1.5 | 1.0 | 1.0 |

*indicates out of the scope of the invention

TABLE 2

| SAMPLE No. | FIRING TEMPERATURE (°C.) | DIELECTRIC CONSTANT ε | DIELECTRIC LOSS tan δ (%) | TCC (%) −55° C. | TCC (%) +125° C. | C$_{MAX}$ | INSULATION RESISTANCE log IR |
|---|---|---|---|---|---|---|---|
| 1 | 1340 | 3110 | 1.6 | −9.7 | +2.5 | 9.7 | 11.8 |
| 2 | 1340 | 3360 | 1.7 | −9.1 | −0.3 | 9.1 | 11.7 |
| 3* | 1360 | 3320 | 1.6 | −14.8 | +18.6 | 35.7 | 11.6 |
| 4* | 1300 | 2910 | 1.7 | −8.2 | −1.7 | 8.2 | 10.4 |
| 5 | 1300 | 3280 | 1.9 | −9.2 | +3.6 | 9.2 | 11.6 |
| 6 | 1340 | 3330 | 1.7 | −9.2 | −0.8 | 9.2 | 11.5 |
| 7 | 1360 | 3190 | 1.8 | −10.9 | +2.4 | 10.9 | 11.6 |
| 8 | 1340 | 3220 | 1.8 | −9.8 | +2.8 | 9.8 | 11.7 |
| 9* | unmeasurable as being semiconductive | | | | | | |
| 10 | 1340 | 3280 | 1.9 | −10.7 | −3.2 | 10.7 | 11.6 |
| 11 | 1360 | 3060 | 1.8 | −11.1 | −3.9 | 11.1 | 11.5 |
| 12* | unmeasurable as not sintered enough at 1360° C. | | | | | | |
| 13 | 1340 | 3180 | 1.8 | −5.7 | +7.9 | 9.8 | 11.7 |
| 14 | 1340 | 3210 | 1.7 | −7.4 | +8.1 | 9.1 | 11.6 |
| 15* | 1320 | 3030 | 1.6 | −3.4 | +8.6 | 8.6 | 9.7 |
| 16 | 1340 | 3160 | 1.7 | −7.3 | +0.3 | 7.3 | 11.7 |
| 17* | 1340 | 2940 | 9.6 | −9.7 | −3.6 | 9.7 | 8.1 |
| 18* | 1340 | 3130 | 1.7 | −15.8 | −3.6 | 15.8 | 10.4 |
| 19 | 1340 | 3220 | 1.7 | −9.1 | −4.8 | 9.1 | 11.6 |
| 20 | 1360 | 3190 | 1.9 | −4.5 | −9.7 | 9.7 | 11.5 |
| 21 | 1340 | 3080 | 1.7 | −6.8 | +4.8 | 6.8 | 11.4 |
| 22 | 1320 | 3010 | 1.6 | −7.6 | +1.8 | 7.6 | 11.2 |
| 23* | 1300 | 2820 | 1.6 | −7.2 | +3.6 | 7.2 | 10.3 |
| 24* | 1340 | 2620 | 1.6 | −7.8 | +3.3 | 7.8 | 11.5 |
| 25* | 1340 | 2460 | 1.5 | −8.2 | +3.7 | 10.8 | 11.4 |

*indicates out of the scope of the invention

TABLE 3

| SAMPLE No. | BaTiO$_3$ (mol %) | Re$_2$O$_3$ (mol %) | CO$_2$O$_3$ (mol %) | BaO (mol %) | MnO (mol %) | MgO (mol %) | OXIDE GLASS (wt parts) |
|---|---|---|---|---|---|---|---|
| 101 | 97.0 | Dy$_2$O$_3$ 1.5 | 1.5 | 1.5 | 1.0 | 1.0 | 1.0 |
| 102 | 99.0 | Dy$_2$O$_3$ 0.5 | 0.5 | 1.5 | 1.0 | 1.0 | 1.0 |
| 103* | 99.6 | Dy$_2$O$_3$ 0.2 | 0.2 | 1.5 | 1.0 | 1.0 | 1.0 |
| 104* | 90.0 | Dy$_2$O$_3$ 5.0 | 5.0 | 1.5 | 1.0 | 1.0 | 1.0 |
| 105 | 93.0 | Dy$_2$O$_3$ 3.0 | 4.0 | 1.5 | 1.0 | 1.0 | 1.0 |
| 106 | 97.5 | Ho$_2$O$_3$ 1.5 | 1.0 | 2.0 | 1.0 | 2.0 | 1.0 |
| 107 | 96.5 | Ho$_2$O$_3$ 1.5 | 2.0 | 0.5 | 1.5 | 2.0 | 1.0 |
| 108 | 96.5 | Ho$_2$O$_3$ 1.5 | 2.0 | 0.3 | 1.5 | 2.0 | 1.0 |
| 109* | 96.5 | Ho$_2$O$_3$ 1.5 | 2.0 | 0.1 | 1.5 | 2.0 | 1.0 |
| 110 | 96.5 | Ho$_2$O$_3$ 1.5 | 2.0 | 3.0 | 1.5 | 2.0 | 1.0 |
| 111 | 96.5 | Ho$_2$O$_3$ 1.5 | 2.0 | 4.0 | 1.5 | 2.0 | 1.0 |
| 112* | 96.5 | Ho$_2$O$_3$ 1.5 | 2.0 | 5.0 | 1.5 | 2.0 | 1.0 |
| 113 | 97.5 | Tb$_2$O$_3$ 1.0 | 1.5 | 1.5 | 2.5 | 3.0 | 1.0 |
| 114 | 97.5 | Tb$_2$O$_3$ 1.0 | 1.5 | 1.5 | 3.0 | 3.0 | 1.0 |
| 115* | 97.5 | Tb$_2$O$_3$ 1.0 | 1.5 | 1.5 | 3.5 | 3.0 | 1.0 |
| 116 | 97.5 | Tb$_2$O$_3$ 1.0 | 1.5 | 1.5 | 0.3 | 3.0 | 1.0 |
| 117* | 97.5 | Tb$_2$O$_3$ 1.0 | 1.5 | 1.5 | 0.1 | 3.0 | 1.0 |
| 118 | 96.5 | Er$_2$O$_3$ 2.0 | 1.5 | 1.5 | 1.5 | 2.0 | 2.0 |
| 119* | 96.5 | Er$_2$O$_3$ 2.0 | 1.5 | 1.5 | 1.5 | 2.0 | 3.0 |
| 120 | 96.5 | Er$_2$O$_3$ 2.0 | 1.5 | 1.5 | 1.5 | 2.0 | 0.5 |
| 121* | 96.5 | Er$_2$O$_3$ 2.0 | 1.5 | 1.5 | 1.5 | 2.0 | 0.3 |
| 122* | 96.0 | Dy$_2$O$_3$ 1.5 | 2.5 | 1.5 | 1.0 | 0.2 | 1.0 |
| 123* | 96.0 | Dy$_2$O$_3$ 1.5 | 2.5 | 1.5 | 1.0 | 0.4 | 1.0 |
| 124 | 96.0 | Dy$_2$O$_3$ 1.5 | 2.5 | 1.5 | 1.0 | 3.0 | 1.0 |
| 125 | 96.0 | Dy$_2$O$_3$ 1.5 | 2.5 | 1.5 | 1.0 | 4.0 | 1.0 |
| 126 | 96.0 | Dy$_2$O$_3$ 1.5 | 2.5 | 1.5 | 1.0 | 5.0 | 1.0 |
| 127* | 96.0 | Dy$_2$O$_3$ 1.5 | 2.5 | 1.5 | 1.0 | 6.0 | 1.0 |
| 128* | 96.0 | Dy$_2$O$_3$ 1.5 | 2.5 | 1.5 | 1.0 | 1.0 | 1.0 |
| 129* | 96.0 | Dy$_2$O$_3$ 1.5 | 2.5 | 1.5 | 1.0 | 1.0 | 1.0 |

*indicates out of the scope of the invention

TABLE 4

| SAMPLE No. | FIRING TEMPERATURE (°C.) | DIELECTRIC CONSTANT ε | DIELECTRIC LOSS tan δ (%) | TCC (%) −55° C. | TCC (%) +125° C. | $C_{MAX}$ | INSULATION RESISTANCE log IR |
|---|---|---|---|---|---|---|---|
| 101 | 1280 | 3150 | 1.7 | −9.2 | +2.1 | 9.2 | 12.7 |
| 102 | 1280 | 3420 | 1.9 | −8.6 | −0.3 | 8.6 | 12.6 |
| 103* | 1300 | 3380 | 1.6 | −13.6 | +18.6 | 38.6 | 12.6 |
| 104* | 1300 | 2820 | 1.7 | −8.8 | −0.6 | 8.8 | 11.7 |
| 105 | 1260 | 3230 | 1.8 | −9.4 | +2.4 | 9.4 | 12.7 |
| 106 | 1260 | 3290 | 1.6 | −9.8 | −0.3 | 9.8 | 12.7 |
| 107 | 1260 | 3160 | 1.7 | −11.8 | +1.8 | 11.8 | 12.5 |
| 108 | 1280 | 3170 | 1.8 | −10.6 | +2.8 | 10.6 | 12.6 |
| 198* | | unmeasurable as being semiconductive | | | | | |
| 110 | 1300 | 3230 | 1.8 | −11.8 | +3.6 | 11.8 | 12.5 |
| 111 | 1300 | 3080 | 1.9 | −11.4 | −4.8 | 11.4 | 12.4 |
| 112* | | unmeasurable as not sintered enough at 1360° C. | | | | | |
| 113 | 1280 | 3160 | 1.7 | −6.8 | +8.2 | 9.4 | 12.6 |
| 114 | 1260 | 3230 | 1.7 | −7.3 | +8.4 | 8.4 | 12.5 |
| 115* | 1260 | 3040 | 1.7 | −3.4 | +9.2 | 9.2 | 10.5 |
| 116 | 1280 | 3170 | 1.6 | −7.6 | +0.3 | 7.6 | 12.6 |
| 117* | 1280 | 2970 | 8.7 | −20.6 | −3.6 | 20.6 | 9.2 |
| 118 | 1260 | 3090 | 1.6 | −9.1 | +2.3 | 9.1 | 12.6 |
| 119* | 1260 | 2880 | 1.8 | −7.8 | +3.8 | 7.8 | 12.4 |
| 120 | 1280 | 3140 | 1.7 | −9.8 | −6.8 | 9.8 | 12.5 |
| 121* | 1360 | 3170 | 1.7 | −8.6 | +7.7 | 8.6 | 11.6 |
| 122* | 1280 | 3130 | 1.6 | −16.8 | −3.6 | 16.8 | 11.5 |
| 123* | 1280 | 3190 | 1.6 | −14.8 | −8.6 | 14.8 | 11.7 |
| 124 | 1300 | 3220 | 1.8 | −3.8 | −9.2 | 9.2 | 12.5 |
| 125 | 1280 | 3100 | 1.7 | −7.4 | +4.8 | 7.4 | 12.3 |
| 126 | 1280 | 3010 | 1.6 | −8.6 | +2.8 | 8.6 | 12.2 |
| 127* | 1280 | 2860 | 1.7 | −8.2 | +3.6 | 8.2 | 11.4 |
| 128* | 1280 | 2610 | 1.5 | −7.2 | +3.3 | 9.8 | 12.5 |
| 129* | 1280 | 2420 | 1.6 | −7.0 | +3.7 | 10.8 | 12.4 |

*indicates out of the scope of the invention

TABLE 5

| SAMPLE No. | $BaTiO_3$ (mol %) | $Re_2O_3$ (mol %) | | $Co_2O_3$ (mol %) | BaO (mol %) | MnO (mol %) | MgO (mol %) | $CaTiO_3$ (mol %) | OXIDE GLASS (wt parts) |
|---|---|---|---|---|---|---|---|---|---|
| 201 | 97.0 | $Dy_2O_3$ | 1.5 | 1.5 | 1.5 | 1.0 | 1.0 | 1.0 | 1.0 |
| 202 | 99.0 | $Dy_2O_3$ | 0.5 | 0.5 | 1.5 | 1.0 | 1.0 | 1.0 | 1.0 |
| 203* | 99.6 | $Dy_2O_3$ | 0.2 | 0.2 | 1.5 | 1.0 | 1.0 | 1.0 | 1.0 |
| 204* | 90.0 | $Dy_2O_3$ | 5.0 | 5.0 | 1.5 | 1.0 | 1.0 | 1.0 | 1.0 |
| 205 | 93.0 | $Dy_2O_3$ | 3.0 | 4.0 | 1.5 | 1.0 | 1.0 | 1.0 | 1.0 |
| 206 | 97.5 | $Ho_2O_3$ | 1.5 | 1.0 | 2.0 | 1.0 | 2.0 | 1.0 | 1.0 |
| 207 | 96.5 | $Ho_2O_3$ | 1.5 | 2.0 | 0.5 | 1.5 | 2.0 | 1.0 | 1.0 |
| 208 | 96.5 | $Ho_2O_3$ | 1.5 | 2.0 | 0.3 | 1.5 | 2.0 | 1.0 | 1.0 |
| 209* | 96.5 | $Ho_2O_3$ | 1.5 | 2.0 | 0.1 | 1.5 | 2.0 | 1.0 | 1.0 |
| 210 | 96.5 | $Ho_2O_3$ | 1.5 | 2.0 | 3.0 | 1.5 | 2.0 | 1.0 | 1.0 |
| 211 | 96.5 | $Ho_2O_3$ | 1.5 | 2.0 | 4.0 | 1.5 | 2.0 | 1.0 | 1.0 |
| 212* | 96.5 | $Ho_2O_3$ | 1.5 | 2.0 | 5.0 | 1.5 | 2.0 | 1.0 | 1.0 |
| 213 | 97.5 | $Tb_2O_3$ | 1.0 | 1.5 | 1.5 | 2.5 | 3.0 | 2.0 | 1.0 |
| 214 | 97.5 | $Tb_2O_3$ | 1.0 | 1.5 | 1.5 | 3.0 | 3.0 | 2.0 | 1.0 |
| 215* | 97.5 | $Tb_2O_3$ | 1.0 | 1.5 | 1.5 | 3.5 | 3.0 | 2.0 | 1.0 |
| 216 | 97.5 | $Tb_2O_3$ | 1.0 | 1.5 | 1.5 | 0.3 | 3.0 | 2.0 | 1.0 |
| 217* | 97.5 | $Tb_2O_3$ | 1.0 | 1.5 | 1.5 | 0.1 | 3.0 | 2.0 | 1.0 |
| 218 | 96.5 | $Tb_2O_3$ | 2.0 | 1.5 | 1.5 | 1.5 | 2.0 | 2.0 | 2.0 |
| 219* | 96.5 | $Tb_2O_3$ | 2.0 | 1.5 | 1.5 | 1.5 | 2.0 | 2.0 | 3.0 |
| 220 | 96.5 | $Tb_2O_3$ | 2.0 | 1.5 | 1.5 | 1.5 | 2.0 | 2.0 | 0.5 |
| 221* | 96.5 | $Tb_2O_3$ | 2.0 | 1.5 | 1.5 | 1.5 | 2.0 | 2.0 | 0.3 |
| 222* | 96.0 | $Er_2O_3$ | 1.5 | 2.5 | 1.5 | 1.0 | 0.2 | 3.0 | 1.5 |
| 223* | 96.0 | $Er_2O_3$ | 1.5 | 2.5 | 1.5 | 1.0 | 0.4 | 3.0 | 1.5 |
| 224 | 96.0 | $Er_2O_3$ | 1.5 | 2.5 | 1.5 | 1.0 | 3.0 | 3.0 | 1.5 |
| 225 | 96.0 | $Er_2O_3$ | 1.5 | 2.5 | 1.5 | 1.0 | 4.0 | 3.0 | 1.5 |
| 226 | 96.0 | $Er_2O_3$ | 1.5 | 2.5 | 1.5 | 1.0 | 5.0 | 3.0 | 1.5 |
| 227* | 96.0 | $Er_2O_3$ | 1.5 | 2.5 | 1.5 | 1.0 | 6.0 | 3.0 | 1.5 |
| 228 | 97.0 | $Dy_2O_3$ | 1.5 | 1.5 | 1.5 | 1.0 | 1.5 | 3.0 | 1.5 |
| 229 | 97.0 | $Dy_2O_3$ | 1.5 | 1.5 | 1.5 | 1.0 | 1.5 | 4.0 | 1.5 |
| 230* | 97.0 | $Dy_2O_3$ | 1.5 | 1.5 | 1.5 | 1.0 | 1.5 | 5.0 | 1.5 |
| 231 | 97.0 | $Dy_2O_3$ | 1.5 | 1.5 | 1.5 | 1.0 | 1.5 | 0.5 | 1.5 |
| 232* | 97.0 | $Dy_2O_3$ | 1.5 | 1.5 | 1.5 | 1.0 | 1.5 | 0.3 | 1.5 |
| 233* | 97.0 | $Dy_2O_3$ | 1.5 | 1.5 | 1.5 | 1.0 | 1.5 | 1.0 | 1.5 |
| 234* | 97.0 | $Dy_2O_3$ | 1.5 | 1.5 | 1.5 | 1.0 | 1.5 | 1.0 | 1.5 |

*indicates out of the scope of the invention

TABLE 6

| SAMPLE No. | FIRING TEMPERATURE (°C.) | DIELECTRIC CONSTANT $\epsilon$ | DIELECTRIC LOSS tan δ (%) | TCC (%) −55° C. | TCC (%) +125° C. | $C_{MAX}$ | INSULATION RESISTANCE log IR | BIAS characteristic ΔC (%) |
|---|---|---|---|---|---|---|---|---|
| 201 | 1280 | 3210 | 1.7 | −9.6 | +1.5 | 9.6 | 12.6 | −11.0 |
| 202 | 1280 | 3360 | 1.8 | −7.9 | −1.1 | 7.9 | 12.5 | −11.8 |
| 203* | 1300 | 3310 | 1.7 | −12.6 | +26.5 | 42.8 | 12.5 | −12.3 |
| 204* | 1300 | 2780 | 1.8 | −8.6 | −1.3 | 8.6 | 11.4 | −12.1 |
| 205 | 1260 | 3290 | 1.7 | −9.1 | +1.9 | 9.1 | 12.7 | −11.6 |
| 206 | 1260 | 3270 | 1.6 | −9.6 | −0.3 | 9.6 | 12.6 | −11.4 |
| 207 | 1260 | 3230 | 1.8 | −10.9 | +1.4 | 10.9 | 12.5 | −12.2 |
| 208 | 1280 | 3290 | 1.7 | −10.3 | +2.8 | 10.3 | 12.5 | −12.5 |
| 209 | | | unmeasurable as being semiconductive | | | | | |
| 210 | 1300 | 3270 | 1.9 | −10.9 | +3.8 | 10.9 | 12.3 | −12.6 |
| 211 | 1300 | 3160 | 2.1 | −11.2 | −4.1 | 11.2 | 12.1 | −11.9 |
| 212* | | | unmeasurable as not sintered enough at 1360° C. | | | | | |
| 213 | 1260 | 3100 | 1.8 | −6.3 | +4.4 | 9.1 | 12.5 | −9.6 |
| 214 | 1260 | 3150 | 118 | −6.1 | +4.1 | 8.8 | 12.2 | −10.1 |
| 215* | 1260 | 3060 | 1.9 | −4.2 | +5.2 | 9.2 | 10.6 | −9.8 |
| 216 | 1280 | 3120 | 1.7 | −9.1 | +0.3 | 9.1 | 12.6 | −10.2 |
| 217* | 1280 | 3010 | 6.9 | −18.4 | +1.2 | 18.4 | 9.8 | −9.9 |
| 218 | 1260 | 3110 | 1.8 | −9.4 | +1.3 | 9.4 | 12.5 | −10.4 |
| 219* | 1260 | 2830 | 1.9 | −7.6 | −0.3 | 7.6 | 12.2 | −10.3 |
| 220 | 1280 | 3170 | 1.7 | −9.7 | −6.5 | 10.3 | 12.4 | −10.0 |
| 221* | 1350 | 3040 | 2.0 | −8.6 | −7.2 | 8.6 | 11.3 | −9.8 |
| 228* | 1280 | 3010 | 1.6 | −17.3 | +6.9 | 26.8 | 11.6 | −7.8 |
| 223* | 1280 | 3090 | 1.7 | −15.4 | +4.8 | 29.3 | 11.7 | −8.1 |
| 224 | 1300 | 3110 | 1.6 | −4.2 | −9.4 | 9.4 | 12.6 | −7.9 |
| 225 | 1280 | 3130 | 1.7 | −6.8 | +3.6 | 7.9 | 12.4 | −8.3 |
| 226 | 1280 | 3030 | 1.8 | −7.1 | +2.8 | 8.3 | 12.3 | −7.7 |
| 227* | 1300 | 2820 | 1.9 | −8.8 | +3.1 | 8.8 | 11.6 | −8.0 |
| 228 | 1280 | 3080 | 1.8 | −7.2 | +2.1 | 7.2 | 12.6 | −7.2 |
| 229 | 1280 | 3010 | 1.7 | −6.1 | −3.3 | 8.1 | 12.6 | −6.3 |
| 230* | 1280 | 2710 | 1.8 | −5.0 | −10.3 | 16.2 | 12.4 | −6.0 |
| 231 | 1280 | 3220 | 1.6 | −9.2 | +2.4 | 9.2 | 12.3 | −13.0 |
| 232* | 1280 | 3200 | 1.7 | −10.1 | +1.2 | 10.1 | 12.5 | −23.9 |
| 233* | 1280 | 2730 | 1.6 | −8.2 | +2.3 | 9.6 | 12.4 | −12.2 |
| 234* | 1280 | 2540 | 1.7 | −8.0 | +2.7 | 10.2 | 12.3 | −12.0 |

*indicates out of the scope of the invention

TABLE 7

| SAMPLE No. | BaTiO₃ (mol %) | Re₂O₃ (mol %) | CO₂O₃ (mol %) | BaO (mol %) | MnO (mol %) | MgO (mol %) | CaZrO₃ (mol %) | OXIDE GLASS (wt parts) |
|---|---|---|---|---|---|---|---|---|
| 301 | 97.0 | Dy₂O₃ 1.5 | 1.5 | 1.5 | 1.0 | 1.0 | 2.0 | 1.5 |
| 302 | 99.0 | Dy₂O₃ 0.5 | 0.5 | 1.5 | 1.0 | 1.0 | 2.0 | 1.5 |
| 303* | 99.6 | Dy₂O₃ 0.2 | 0.2 | 1.5 | 1.0 | 1.0 | 2.0 | 1.5 |
| 304* | 90.0 | Dy₂O₃ 5.0 | 5.0 | 1.5 | 1.0 | 1.0 | 2.0 | 1.5 |
| 305 | 93.0 | Dy₂O₃ 3.0 | 4.0 | 1.5 | 1.0 | 1.0 | 2.0 | 1.5 |
| 306 | 96.5 | Ho₂O₃ 1.5 | 2.0 | 2.0 | 1.0 | 2.0 | 2.0 | 1.5 |
| 307 | 96.5 | Ho₂O₃ 1.5 | 2.0 | 0.5 | 1.5 | 2.0 | 2.0 | 1.5 |
| 308 | 96.5 | Ho₂O₃ 1.5 | 2.0 | 0.3 | 1.5 | 2.0 | 2.0 | 1.5 |
| 309* | 96.5 | Ho₂O₃ 1.5 | 2.0 | 0.1 | 1.5 | 2.0 | 2.0 | 1.5 |
| 310 | 96.5 | Ho₂O₃ 1.5 | 2.0 | 3.0 | 1.5 | 2.0 | 2.0 | 1.5 |
| 311 | 96.5 | Ho₂O₃ 1.5 | 2.0 | 4.0 | 1.5 | 2.0 | 2.0 | 1.5 |
| 312* | 96.5 | Ho₂O₃ 1.5 | 2.0 | 5.0 | 1.5 | 2.0 | 2.0 | 1.5 |
| 313 | 97.5 | Er₂O₃ 1.0 | 1.5 | 1.5 | 2.5 | 3.0 | 2.5 | 1.5 |
| 314 | 97.5 | Er₂O₃ 1.0 | 1.5 | 1.5 | 3.0 | 3.0 | 2.5 | 1.5 |
| 315* | 97.5 | Er₂O₃ 1.0 | 1.5 | 1.5 | 3.5 | 3.0 | 2.5 | 1.5 |
| 316 | 97.5 | Er₂O₃ 1.0 | 1.5 | 1.5 | 0.3 | 3.0 | 2.5 | 1.5 |
| 317* | 97.5 | Er₂O₃ 1.0 | 1.5 | 1.5 | 0.1 | 3.0 | 2.5 | 1.5 |
| 318 | 96.5 | Er₂O₃ 2.0 | 1.5 | 1.5 | 1.5 | 2.0 | 2.5 | 2.0 |
| 319* | 96.5 | Er₂O₃ 2.0 | 1.5 | 1.5 | 1.5 | 2.0 | 2.5 | 3.0 |
| 320 | 96.5 | Er₂O₃ 2.0 | 1.5 | 1.5 | 1.5 | 2.0 | 2.5 | 0.5 |
| 321* | 96.5 | Er₂O₃ 2.0 | 1.5 | 1.5 | 1.5 | 2.0 | 2.5 | 0.3 |
| 322* | 97.5 | Tb₂O₃ 1.5 | 1.0 | 1.5 | 1.0 | 0.2 | 3.0 | 1.0 |
| 323* | 97.5 | Tb₂O₃ 1.5 | 1.0 | 1.5 | 1.0 | 0.4 | 3.0 | 1.0 |
| 324 | 97.5 | Tb₂O₃ 1.5 | 1.0 | 1.5 | 1.0 | 3.0 | 3.0 | 1.0 |
| 325 | 97.5 | Tb₂O₃ 1.5 | 1.0 | 1.5 | 1.0 | 5.0 | 3.0 | 1.0 |
| 326* | 97.5 | Tb₂O₃ 1.5 | 1.0 | 1.5 | 1.0 | 6.0 | 3.0 | 1.0 |
| 327 | 98.0 | Dy₂O₃ 1.0 | 1.0 | 1.5 | 1.0 | 1.5 | 3.0 | 1.0 |
| 328 | 98.0 | Dy₂O₃ 1.0 | 1.0 | 1.5 | 1.0 | 1.5 | 3.5 | 1.0 |
| 329* | 98.0 | Dy₂O₃ 1.0 | 1.0 | 1.5 | 1.0 | 1.5 | 4.0 | 1.0 |
| 330 | 98.0 | Dy₂O₃ 1.0 | 1.0 | 1.5 | 1.0 | 1.5 | 0.5 | 1.0 |
| 331* | 98.0 | Dy₂O₃ 1.0 | 1.0 | 1.5 | 1.0 | 1.5 | 0.4 | 1.0 |
| 322* | 98.0 | Dy₂O₃ 1.0 | 1.0 | 1.5 | 1.0 | 1.5 | 0.3 | 1.0 |
| 333* | 98.0 | Dy₂O₃ 1.0 | 1.0 | 1.5 | 1.0 | 1.5 | 1.5 | 1.0 |
| 334* | 98.0 | Dy₂O₃ 1.0 | 1.0 | 1.5 | 1.0 | 1.5 | 1.5 | 1.0 |

*indicates out of the scope of the invention

TABLE 8

| SAMPLE No. | FIRING TEMPERATURE (°C.) | DIELECTRIC CONSTANT $\epsilon$ | DIELECTRIC LOSS tan δ (%) | TCC (%) −55° C. | TCC (%) +125° C. | $C_{MAX}$ | RC PRODUCT (Ω · F) | MTTF (hour) |
|---|---|---|---|---|---|---|---|---|
| 301 | 1280 | 3390 | 1.8 | −0.7 | −11.7 | 11.7 | 6670 | 780 |
| 302 | 1280 | 3360 | 1.8 | −0.9 | −11.1 | 11.1 | 7430 | 810 |
| 303* | 1300 | 3310 | 1.7 | −15.3 | +29.5 | 52.8 | 3980 | not measured |
| 304* | 1300 | 2820 | 1.8 | −0.6 | −11.3 | 11.3 | 2420 | 830 |
| 305 | 1280 | 3190 | 1.7 | −0.1 | −11.9 | 11.9 | 4100 | 790 |
| 306 | 1260 | 3370 | 1.6 | −0.6 | −10.3 | 10.3 | 5800 | 910 |
| 307 | 1260 | 3230 | 1.8 | −0.9 | −11.4 | 11.4 | 4830 | 870 |
| 308 | 1260 | 3290 | 1.7 | −0.3 | −12.8 | 12.8 | 4420 | 800 |
| 309* | unmeasurable as being semiconductive | | | | | | | |
| 310 | 1300 | 3370 | 1.9 | −0.9 | −10.8 | 10.8 | 4890 | 740 |
| 311 | 1300 | 3260 | 1.7 | −1.2 | −10.1 | 10.1 | 5210 | 850 |
| 312* | unmeasurable as not sintered enough at 1360° C. | | | | | | | |
| 313 | 1260 | 3200 | 1.8 | −0.3 | −11.2 | 11.2 | 4830 | 840 |
| 314 | 1260 | 3150 | 1.8 | −0.1 | −10.8 | 10.8 | 2500 | 870 |
| 315* | 1260 | 3060 | 1.9 | +0.2 | −10.7 | 10.7 | 2810 | 820 |
| 316 | 1280 | 3320 | 1.7 | −0.1 | −10.3 | 10.3 | 6720 | 950 |
| 317* | 1300 | 3010 | 6.9 | −4.2 | −11.2 | 11.2 | 860 | 27 |
| 318 | 1260 | 3410 | 1.8 | −0.4 | −10.3 | 10.3 | 6810 | 860 |
| 319* | 1260 | 2730 | 2.0 | −0.6 | −14.9 | 14.9 | 4040 | 800 |
| 320 | 1280 | 3270 | 1.8 | −0.7 | −10.6 | 10.6 | 6090 | >1000 |
| 321* | 1350 | 3140 | 2.8 | −0.6 | −9.8 | 9.8 | 1390 | 160 |
| 322* | 1280 | 3110 | 1.6 | −18.3 | +24.1 | 28.1 | 3480 | 930 |
| 323* | 1280 | 3190 | 1.7 | −17.4 | +26.6 | 31.6 | 3710 | 960 |
| 324 | 1300 | 3340 | 1.8 | −0.2 | −9.4 | 9.4 | 6920 | >1000 |
| 325 | 1280 | 3290 | 1.7 | −0.1 | −8.8 | 8.8 | 7020 | >1000 |
| 326* | 1300 | 2820 | 1.9 | −0.8 | −9.1 | 9.1 | 3080 | >1000 |
| 327 | 1280 | 3280 | 1.8 | −0.2 | −11.4 | 11.4 | 6890 | 980 |
| 328 | 1280 | 3410 | 1.7 | −0.1 | −12.1 | 12.1 | 6510 | >1000 |
| 329* | 1260 | 2810 | 1.8 | +0.4 | −17.3 | 17.3 | 4210 | >1000 |
| 330 | 1280 | 3220 | 1.6 | +0.2 | −10.1 | 10.1 | 5980 | 620 |
| 331* | 1280 | 3310 | 1.7 | ±0.0 | −9.8 | 9.8 | 5380 | 340 |
| 332* | 1280 | 3200 | 1.8 | −0.6 | −11.2 | 11.2 | 5870 | 270 |
| 333* | 1280 | 2840 | 1.6 | −0.2 | −10.8 | 10.8 | 4930 | 710 |
| 334* | 1280 | 2620 | 1.7 | ±0.0 | −10.4 | 10.4 | 4520 | 690 |

*indicates out of the scope of the invention

TABLE 9

| SAMPLE No. | $BaTiO_3$ (mol %) | $Re_2O_3$ (mol %) | | $CO_2O_3$ (mol %) | BaO (mol %) | MnO (mol %) | MgO (mol %) | $SiO_2$ (mol %) |
|---|---|---|---|---|---|---|---|---|
| 401 | 97.0 | $Dy_2O_3$ | 1.5 | 1.5 | 1.5 | 1.0 | 1.0 | 2.0 |
| 402 | 99.0 | $Dy_2O_3$ | 0.5 | 0.5 | 1.5 | 1.0 | 1.0 | 2.0 |
| 403* | 99.6 | $Dy_2O_3$ | 0.2 | 0.2 | 1.5 | 1.0 | 1.0 | 2.0 |
| 404* | 90.0 | $Dy_2O_3$ | 5.0 | 5.0 | 1.5 | 1.0 | 1.0 | 2.0 |
| 405 | 93.0 | $Dy_2O_3$ | 3.0 | 4.0 | 1.5 | 1.0 | 1.0 | 2.0 |
| 406 | 97.5 | $Ho_2O_3$ | 1.5 | 1.0 | 2.0 | 1.0 | 2.0 | 2.0 |
| 407 | 96.5 | $Ho_2O_3$ | 1.5 | 2.0 | 0.5 | 1.5 | 2.0 | 2.0 |
| 408 | 96.5 | $Ho_2O_3$ | 1.5 | 2.0 | 0.3 | 1.5 | 2.0 | 2.0 |
| 409* | 96.5 | $Ho_2O_3$ | 1.5 | 2.0 | 0.1 | 1.5 | 2.0 | 2.0 |
| 410 | 96.5 | $Ho_2O_3$ | 1.5 | 2.0 | 3.0 | 1.5 | 2.0 | 2.0 |
| 411 | 96.5 | $Ho_2O_3$ | 1.5 | 2.0 | 4.0 | 1.5 | 2.0 | 2.0 |
| 412* | 96.5 | $Ho_2O_3$ | 1.5 | 2.0 | 5.0 | 1.5 | 2.0 | 2.0 |
| 413 | 97.5 | $Tb_2O_3$ | 1.0 | 1.5 | 1.5 | 2.5 | 3.0 | 3.0 |
| 414 | 97.5 | $Tb_2O_3$ | 1.0 | 1.5 | 1.5 | 3.0 | 3.0 | 3.0 |
| 415* | 97.5 | $Tb_2O_3$ | 1.0 | 1.5 | 1.5 | 3.5 | 3.0 | 3.0 |
| 416 | 97.5 | $Tb_2O_3$ | 1.0 | 1.5 | 1.5 | 0.3 | 3.0 | 3.0 |
| 417* | 97.5 | $Tb_2O_3$ | 1.0 | 1.5 | 1.5 | 0.1 | 3.0 | 3.0 |
| 418 | 96.5 | $Er_2O_3$ | 2.0 | 1.5 | 1.5 | 1.5 | 2.0 | 3.0 |
| 419 | 96.5 | $Er_2O_3$ | 2.0 | 1.5 | 1.5 | 1.5 | 2.0 | 5.0 |
| 420* | 96.5 | $Er_2O_3$ | 2.0 | 1.5 | 1.5 | 1.5 | 2.0 | 6.0 |
| 421 | 96.5 | $Er_2O_3$ | 2.0 | 1.5 | 1.5 | 1.5 | 2.0 | 0.5 |
| 422 | 96.5 | $Er_2O_3$ | 2.0 | 1.5 | 1.5 | 1.5 | 2.0 | 0.3 |
| 423* | 96.5 | $Er_2O_3$ | 2.0 | 1.5 | 1.5 | 1.5 | 2.0 | 0.1 |
| 424* | 96.0 | $Dy_2O_3$ | 1.5 | 2.5 | 1.5 | 1.0 | 0.4 | 1.0 |
| 425 | 96.0 | $Dy_2O_3$ | 1.5 | 2.5 | 1.5 | 1.0 | 0.6 | 1.0 |
| 426 | 96.0 | $Dy_2O_3$ | 1.5 | 2.5 | 1.5 | 1.0 | 3.0 | 1.0 |
| 427 | 96.0 | $Dy_2O_3$ | 1.5 | 2.5 | 1.5 | 1.0 | 4.0 | 1.0 |
| 428 | 96.0 | $Dy_2O_3$ | 1.5 | 2.5 | 1.5 | 1.0 | 5.0 | 1.0 |
| 429* | 96.0 | $Dy_2O_3$ | 1.5 | 2.5 | 1.5 | 1.0 | 6.0 | 1.0 |
| 430* | 96.0 | $Dy_2O_3$ | 1.5 | 2.5 | 1.5 | 1.0 | 1.0 | 1.0 |
| 431* | 96.0 | $Dy_2O_3$ | 1.5 | 2.5 | 1.5 | 1.0 | 1.0 | 1.0 |

*indicates out of the scope of the invention

TABLE 10

| SAMPLE No. | FIRING TEMPERATURE (°C.) | DIELECTRIC CONSTANT $\epsilon$ | DIELECTRIC LOSS tan δ (%) | TCC (%) −55° C. | TCC (%) +125° C. | $C_{MAX}$ | INSULATION RESISTANCE log IR |
|---|---|---|---|---|---|---|---|
| 401 | 1280 | 3180 | 1.8 | −10.8 | +1.9 | 10.8 | 11.8 |
| 402 | 1280 | 3390 | 1.7 | −8.9 | −1.8 | 8.9 | 11.7 |
| 403* | 1300 | 3430 | 1.8 | −14.6 | +20.7 | 32.4 | 11.6 |
| 404* | 1260 | 2940 | 1.6 | −7.8 | −1.3 | 7.8 | 10.5 |
| 405 | 1260 | 3260 | 1.7 | −8.9 | +3.5 | 8.9 | 11.8 |
| 406 | 1260 | 3260 | 1.5 | −9.6 | −0.8 | 9.6 | 11.6 |
| 407 | 1260 | 3130 | 1.6 | −10.7 | +3.2 | 10.7 | 11.6 |
| 408 | 1280 | 3190 | 1.7 | −9.9 | +3.4 | 9.9 | 11.7 |
| 409* | | unmeasurable as being semiconductive | | | | | |
| 410 | 1300 | 3280 | 1.8 | −10.9 | +2.7 | 10.9 | 11.6 |
| 411 | 1300 | 3090 | 1.8 | −10.9 | −5.2 | 10.9 | 11.3 |
| 412* | | unmeasurble as not sintered enough at 1360° C. | | | | | |
| 413 | 1280 | 3190 | 1.8 | −7.2 | +9.1 | 9.6 | 11.6 |
| 414 | 1260 | 3210 | 1.7 | −6.9 | +7.6 | 8.4 | 11.5 |
| 415* | 1260 | 3010 | 1.8 | −3.4 | +8.8 | 9.2 | 9.5 |
| 416 | 1280 | 3110 | 1.7 | −9.7 | +0.3 | 9.7 | 11.6 |
| 417* | 1280 | 2940 | 8.9 | −11.2 | −3.8 | 11.2 | 8.1 |
| 418 | 1260 | 3120 | 1.6 | −8.9 | +2.8 | 8.9 | 11.7 |
| 419 | 1260 | 3050 | 1.7 | −8.6 | +2.9 | 8.6 | 11.3 |
| 420* | 1280 | 2680 | 1.6 | −9.6 | −6.8 | 10.2 | 11.1 |
| 421 | 1280 | 3230 | 1.7 | −8.4 | +4.1 | 8.4 | 11.4 |
| 422 | 1300 | 3290 | 1.6 | −11.2 | +1.8 | 11.2 | 11.2 |
| 423* | 1360 | 3010 | 1.8 | −12.9 | +3.6 | 12.9 | 11.1 |
| 424* | 1280 | 3160 | 1.7 | −17.3 | −4.2 | 17.3 | 10.6 |
| 425 | 1280 | 3170 | 1.6 | −10.8 | −4.6 | 10.8 | 11.5 |
| 426 | 1300 | 3240 | 1.8 | −4.1 | −9.2 | 9.2 | 11.5 |
| 427 | 1280 | 3160 | 1.7 | −7.6 | +4.8 | 7.6 | 11.4 |
| 428 | 1280 | 3040 | 1.6 | −9.3 | +2.8 | 9.3 | 11.2 |
| 429* | 1280 | 2820 | 1.6 | −7.8 | +2.9 | 7.9 | 10.2 |
| 430* | 1280 | 2640 | 1.7 | −6.7 | +3.3 | 9.8 | 11.3 |
| 431* | 1280 | 2480 | 1.6 | −7.3 | +3.7 | 10.8 | 11.2 |

*indicates out of the-scope of the invention

TABLE 11

| SAMPLE No. | $BaTiO_3$ (mol %) | $Re_2O_3$ (mol %) | | $Co_2O_3$ (mol %) | BaO (mol %) | MnO (mol %) | NiO (mol %) | $Al_2O_3$ (mol %) | MgO |
|---|---|---|---|---|---|---|---|---|---|
| 501 | 97.0 | $Dy_2O_3$ | 1.5 | 1.5 | 1.5 | 0.3 | NiO | 1.0 | 1.0 |
| 502 | 99.0 | $Dy_2O_3$ | 0.5 | 0.5 | 1.5 | 0.3 | NiO | 1.0 | 1.0 |
| 503* | 99.6 | $Dy_2O_3$ | 0.2 | 0.2 | 1.5 | 0.3 | NiO | 1.0 | 1.0 |
| 504* | 90.0 | $Dy_2O_3$ | 5.0 | 5.0 | 1.5 | 0.3 | NiO | 1.0 | 1.0 |
| 505 | 93.0 | $Dy_2O_3$ | 3.0 | 4.0 | 1.5 | 0.3 | NiO | 1.0 | 1.0 |
| 506 | 97.5 | $Ho_2O_3$ | 1.5 | 1.0 | 2.0 | 0.3 | NiO | 1.0 | 2.0 |
| 507 | 96.5 | $Ho_2O_3$ | 1.5 | 2.0 | 0.5 | 0.5 | $Al_2O_3$ | 1.0 | 2.0 |
| 508 | 96.5 | $Ho_2O_3$ | 1.5 | 2.0 | 0.3 | 0.5 | $Al_2O_3$ | 1.0 | 2.0 |
| 509* | 96.5 | $Ho_2O_3$ | 1.5 | 2.0 | 0.1 | 0.5 | $Al_2O_3$ | 1.0 | 2.0 |
| 510 | 96.5 | $Ho_2O_3$ | 1.5 | 2.0 | 3.0 | 0.5 | $Al_2O_3$ | 1.0 | 2.0 |
| 511 | 96.5 | $Ho_2O_3$ | 1.5 | 2.0 | 4.0 | 0.5 | $Al_2O_3$ | 1.0 | 2.0 |
| 512* | 96.5 | $Ho_2O_3$ | 1.5 | 2.0 | 5.0 | 0.5 | $Al_2O_3$ | 1.0 | 2.0 |
| 513 | 97.5 | $Tb_2O_3$ | 1.0 | 1.5 | 1.5 | 1.5 | NiO | 0.5 | 3.0 |
| 514 | 97.5 | $Tb_2O_3$ | 1.0 | 1.5 | 1.5 | 2.0 | NiO | 0.5 | 3.0 |
| 515* | 97.5 | $Tb_2O_3$ | 1.0 | 1.5 | 1.5 | 2.5 | NiO | 0.5 | 3.0 |
| 516 | 97.5 | $Tb_2O_3$ | 1.0 | 1.5 | 1.5 | 0.2 | NiO | 0.5 | 3.0 |
| 517* | 97.5 | $Tb_2O_3$ | 1.0 | 1.5 | 1.5 | 0.1 | NiO | 0.5 | 3.0 |
| 518* | 97.0 | $Ho_2O_3$ | 1.5 | 1.5 | 1.5 | 0.5 | NiO | 0.2 | 2.5 |
| 519 | 97.0 | $Ho_2O_3$ | 1.5 | 1.5 | 1.5 | 0.5 | NiO | 2.0 | 2.5 |
| 520 | 97.0 | $Ho_2O_3$ | 1.5 | 1.5 | 1.5 | 0.5 | NiO | 3.0 | 2.5 |
| 521* | 97.0 | $Ho_2O_3$ | 1.5 | 1.5 | 1.5 | 0.5 | NiO | 3.5 | 2.5 |
| 522* | 97.0 | $Ho_2O_3$ | 1.5 | 1.5 | 1.5 | 0.5 | $Al_2O_3$ | 3.5 | 2.5 |
| 523 | 96.5 | $Ho_2O_3$ | 2.0 | 1.5 | 1.5 | 1.0 | $Al_2O_3$ | 1.5 | 2.0 |
| 524* | 96.0 | $Dy_2O_3$ | 1.5 | 2.5 | 1.5 | 0.3 | $Al_2O_3$ | 1.5 | 0.2 |
| 525* | 96.0 | $Dy_2O_3$ | 1.5 | 2.5 | 1.5 | 0.3 | $Al_2O_3$ | 1.5 | 0.4 |
| 526 | 96.0 | $Dy_2O_3$ | 1.5 | 2.5 | 1.5 | 0.3 | NiO | 1.5 | 3.0 |
| 527 | 96.0 | $Dy_2O_3$ | 1.5 | 2.5 | 1.5 | 0.3 | NiO | 1.5 | 4.0 |
| 528 | 96.0 | $Dy_2O_3$ | 1.5 | 2.5 | 1.5 | 0.3 | NiO | 1.5 | 5.0 |
| 529* | 96.0 | $Dy_2O_3$ | 1.5 | 2.5 | 1.5 | 0.3 | NiO | 1.5 | 6.0 |
| 530* | 96.0 | $Dy_2O_3$ | 1.5 | 2.5 | 1.5 | 0.3 | NiO | 1.0 | 1.0 |
| 531* | 96.0 | $Dy_2O_3$ | 1.5 | 2.5 | 1.5 | 0.3 | NiO | 1.0 | 1.0 |

*indicates out of the scope of the invention

TABLE 12

| SAMPLE No. | FIRING TEMPERATURE (°C.) | DIELECTRIC CONSTANT $\epsilon$ | DIELECTRIC LOSS tan δ (%) | TCC (%) −55° C. | TCC (%) +125° C. | $C_{MAX}$ | log IR 25° C. | log IR 125° C. |
|---|---|---|---|---|---|---|---|---|
| 501 | 1320 | 3090 | 1.6 | −11.2 | +4.3 | 11.2 | 11.7 | 10.5 |
| 502 | 1320 | 3160 | 1.5 | −9.8 | −0.9 | 9.8 | 11.8 | 10.4 |
| 503* | 1320 | 3340 | 1.7 | −16.1 | +17.1 | 42.3 | 11.6 | 10.5 |
| 504* | 1360 | 2820 | 1.6 | −8.3 | −1.9 | 8.3 | 10.9 | 9.3 |
| 505 | 1340 | 3180 | 1.7 | −10.9 | +2.2 | 10.9 | 11.8 | 10.2 |
| 506 | 1320 | 3260 | 1.4 | −10.3 | −0.8 | 10.3 | 11.6 | 10.6 |
| 507 | 1320 | 3200 | 1.7 | −11.2 | +2.1 | 11.2 | 11.5 | 10.2 |
| 508 | 1320 | 3090 | 1.8 | −10.9 | +4.1 | 10.9 | 11.7 | 10.3 |
| 509* | | unmeasurable as being semiconductive | | | | | | |
| 510 | 1360 | 3160 | 1.4 | −12.3 | −3.3 | 12.3 | 11.6 | 10.3 |
| 511 | 1360 | 3140 | 1.5 | −10.4 | −4.8 | 10.4 | 11.7 | 10.4 |
| 512* | | unmeasurble as not sintered enough at 1360° C. | | | | | | |
| 513 | 1320 | 3180 | 1.6 | −8.1 | +8.4 | 9.8 | 11.8 | 10.3 |
| 514 | 1320 | 3260 | 1.7 | −7.6 | +8.1 | 8.1 | 11.7 | 10.2 |
| 515* | 1320 | 3080 | 1.7 | −6.8 | +4.1 | 9.8 | 10.6 | 8.3 |
| 516 | 1340 | 3200 | 1.8 | −9.1 | +1.2 | 9.1 | 11.8 | 10.4 |
| 517* | 1340 | 3050 | 6.8 | −21.9 | −3.8 | 21.9 | 8.9 | 6.1 |
| 518* | 1320 | 3130 | 3.8 | −14.1 | +2.8 | 14.1 | 8.8 | 6.5 |
| 519 | 1320 | 3240 | 1.8 | −10.1 | +5.1 | 10.1 | 11.6 | 10.2 |
| 520 | 1300 | 3170 | 1.6 | −9.8 | +4.2 | 9.8 | 11.7 | 10.3 |
| 521* | 1300 | 3120 | 1.7 | −6.2 | +2.5 | 6.2 | 9.5 | 6.7 |
| 522* | 1360 | 2780 | 2.3 | −7.9 | +3.9 | 7.9 | 10.9 | 9.8 |
| 523 | 1360 | 3180 | 1.6 | −9.1 | +3.5 | 9.1 | 11.9 | 10.4 |
| 524* | 1320 | 3190 | 1.5 | −15.3 | −3.6 | 15.3 | 10.9 | 9.8 |
| 525* | 1320 | 3230 | 1.5 | −15.1 | −8.6 | 15.1 | 11.2 | 10.1 |
| 526 | 1360 | 3120 | 1.4 | −6.2 | −6.9 | 9.8 | 11.8 | 10.3 |
| 527 | 1360 | 3070 | 1.6 | −4.6 | −5.8 | 7.1 | 11.7 | 10.2 |
| 528 | 1360 | 3040 | 1.8 | −4.3 | −4.5 | 8.6 | 11.6 | 10.1 |
| 529* | 1360 | 2910 | 1.9 | −3.1 | −7.6 | 7.6 | 11.0 | 9.4 |
| 530* | 1320 | 2680 | 1.6 | −9.7 | +4.8 | 9.7 | 11.7 | 10.2 |
| 531* | 1320 | 2510 | 1.7 | −8.5 | +3.7 | 10.2 | 11.6 | 10.0 |

*indicates out of the scope of the invention

TABLE 13

| SAMPLE No. | BaTiO$_2$ (mol %) | Re$_2$O$_3$ (mol %) | Co$_2$O$_3$ (mol %) | BaO (mol %) | MnO (mol %) | NiO, Al$_2$O$_3$ (mol %) | MgO (mol %) | OXIDE GLASS (wt parts) |
|---|---|---|---|---|---|---|---|---|
| 601 | 97.0 | Dy$_2$O$_3$ 1.5 | 1.5 | 1.5 | 0.3 | NiO 1.0 | 1.0 | 1.0 |
| 602 | 99.0 | Dy$_2$O$_3$ 0.5 | 0.5 | 1.5 | 0.3 | NiO 1.0 | 1.0 | 1.0 |
| 603* | 99.6 | Dy$_2$O$_3$ 0.2 | 0.2 | 1.5 | 0.3 | NiO 1.0 | 1.0 | 1.0 |
| 604* | 90.0 | Dy$_2$O$_3$ 5.0 | 5.0 | 1.5 | 0.3 | NiO 1.0 | 1.0 | 1.0 |
| 605 | 93.0 | Dy$_2$O$_3$ 3.0 | 4.0 | 1.5 | 0.3 | NiO 1.0 | 1.0 | 1.0 |
| 606 | 97.5 | Ho$_2$O$_3$ 1.5 | 1.0 | 2.0 | 0.3 | NiO 1.0 | 2.0 | 1.0 |
| 607 | 96.5 | Ho$_2$O$_3$ 1.5 | 2.0 | 0.5 | 0.5 | Al$_2$O$_3$ 1.0 | 2.0 | 1.0 |
| 608 | 96.5 | Ho$_2$O$_3$ 1.5 | 2.0 | 0.3 | 0.5 | Al$_2$O$_3$ 1.0 | 2.0 | 1.0 |
| 609* | 96.5 | Ho$_2$O$_3$ 1.5 | 2.0 | 0.1 | 0.5 | Al$_2$O$_3$ 1.0 | 2.0 | 1.0 |
| 610 | 96.5 | Ho$_2$O$_3$ 1.5 | 2.0 | 3.0 | 0.5 | Al$_2$O$_3$ 1.0 | 2.0 | 1.0 |
| 611 | 96.5 | Ho$_2$O$_3$ 1.5 | 2.0 | 4.0 | 0.5 | Al$_2$O$_3$ 1.0 | 2.0 | 1.0 |
| 612* | 96.5 | Ho$_2$O$_3$ 1.5 | 2.0 | 5.0 | 0.5 | Al$_2$O$_3$ 1.0 | 2.0 | 1.0 |
| 613 | 97.5 | Tb$_2$O$_3$ 1.0 | 1.5 | 1.5 | 1.5 | NiO 0.5 | 3.0 | 1.0 |
| 614 | 97.5 | Tb$_2$O$_3$ 1.0 | 1.5 | 1.5 | 2.0 | NiO 0.5 | 3.0 | 1.0 |
| 615* | 97.5 | Tb$_2$O$_3$ 1.0 | 1.5 | 1.5 | 2.5 | NiO 0.5 | 3.0 | 1.0 |
| 616 | 97.5 | Tb$_2$O$_3$ 1.0 | 1.5 | 1.5 | 0.2 | NiO 0.5 | 3.0 | 1.0 |
| 617* | 97.5 | Tb$_2$O$_3$ 1.0 | 1.5 | 1.5 | 0.1 | NiO 0.5 | 3.0 | 1.0 |
| 618* | 97.0 | Ho$_2$O$_3$ 1.5 | 1.5 | 1.5 | 0.5 | NiO 0.2 | 2.5 | 1.5 |
| 619 | 97.0 | Ho$_2$O$_3$ 1.5 | 1.5 | 1.5 | 0.5 | NiO 2.0 | 2.5 | 1.5 |
| 620 | 97.0 | Ho$_2$O$_3$ 1.5 | 1.5 | 1.5 | 0.5 | NiO 3.0 | 2.5 | 1.5 |
| 621* | 97.0 | Ho$_2$O$_3$ 1.5 | 1.5 | 1.5 | 0.5 | NiO 3.5 | 2.5 | 1.5 |
| 622* | 97.0 | Ho$_2$O$_3$ 1.5 | 1.5 | 1.5 | 0.5 | Al$_2$O$_3$ 3.5 | 2.5 | 1.5 |
| 623 | 96.5 | Er$_2$O$_3$ 2.0 | 1.5 | 1.5 | 1.0 | Al$_2$O$_3$ 1.5 | 2.0 | 2.0 |
| 624* | 96.5 | Er$_2$O$_3$ 2.0 | 1.5 | 1.5 | 1.0 | Al$_2$O$_3$ 1.5 | 2.0 | 3.0 |
| 625 | 96.5 | Er$_2$O$_3$ 2.0 | 1.5 | 1.5 | 1.0 | Al$_2$O$_3$ 1.5 | 2.0 | 0.5 |
| 626* | 96.5 | Er$_2$O$_3$ 2.0 | 1.5 | 1.5 | 1.0 | Al$_2$O$_3$ 1.5 | 2.0 | 0.3 |
| 627* | 96.0 | Dy$_2$O$_3$ 1.5 | 2.5 | 1.5 | 0.3 | Al$_2$O$_3$ 1.5 | 0.2 | 1.0 |
| 628* | 96.0 | Dy$_2$O$_3$ 1.5 | 2.5 | 1.5 | 0.3 | Al$_2$O$_3$ 1.5 | 0.4 | 1.0 |
| 629 | 96.0 | Dy$_2$O$_3$ 1.5 | 2.5 | 1.5 | 0.3 | NiO 1.5 | 3.0 | 1.0 |
| 630 | 96.0 | Dy$_2$O$_3$ 1.5 | 2.5 | 1.5 | 0.3 | NiO 1.5 | 4.0 | 1.0 |
| 631 | 96.0 | Dy$_2$O$_3$ 1.5 | 2.5 | 1.5 | 0.3 | NiO 1.5 | 5.0 | 1.0 |
| 532* | 96.0 | Dy$_2$O$_3$ 1.5 | 2.5 | 1.5 | 0.3 | NiO 1.5 | 6.0 | 1.0 |
| 633* | 96.0 | Dy$_2$O$_3$ 1.5 | 2.5 | 1.5 | 0.3 | NiO 1.0 | 1.0 | 1.0 |
| 634* | 96.0 | Dy$_2$O$_3$ 1.5 | 2.5 | 1.5 | 0.3 | NiO 1.0 | 1.0 | 1.0 |

*indicates out of the scope of the invention

TABLE 14

| SAMPLE No. | FIRING TEMPERATURE (°C.) | DIELECTRIC CONSTANT $\epsilon$ | DIELECTRIC LOSS tan δ (%) | TCC (%) −55° C. | TCC (%) +125° C. | $C_{MAX}$ | log IR 25° C. | log IR 125° C. |
|---|---|---|---|---|---|---|---|---|
| 601 | 1250 | 3180 | 1.8 | −10.6 | +3.5 | 10.6 | 12.8 | 11.0 |
| 602 | 1250 | 3390 | 1.7 | −9.6 | −0.8 | 9.6 | 12.6 | 10.9 |
| 603* | 1250 | 3280 | 1.8 | −15.8 | +16.6 | 41.2 | 12.7 | 10.8 |
| 604* | 1280 | 2790 | 1.7 | −7.9 | −1.2 | 7.9 | 11.8 | 9.8 |
| 605 | 1230 | 3240 | 1.7 | −10.5 | +1.9 | 10.5 | 12.6 | 10.8 |
| 606 | 1230 | 3300 | 1.6 | −10.1 | −0.3 | 10.1 | 12.7 | 11.0 |
| 607 | 1230 | 3180 | 1.8 | −10.8 | +1.8 | 10.8 | 12.6 | 10.7 |
| 608 | 1250 | 3120 | 1.9 | −10.2 | +3.6 | 10.2 | 12.6 | 10.8 |
| 609* | unmeasurable as being semiconductive | | | | | | | |
| 610 | 1280 | 3210 | 1.6 | −21.1 | −2.9 | 12.1 | 12.4 | 10.8 |
| 611 | 1280 | 3110 | 1.8 | −10.7 | −4.5 | 10.7 | 12.5 | 10.9 |
| 612* | unmeasurable as not sintered enough at 1360° C. | | | | | | | |
| 613 | 1250 | 3140 | 1.7 | −7.0 | +8.5 | 9.4 | 12.7 | 10.7 |
| 614 | 1230 | 3290 | 1.7 | −7.3 | +8.4 | 8.4 | 12.6 | 10.5 |
| 615* | 1230 | 3060 | 1.6 | −6.5 | +3.5 | 9.2 | 11.2 | 8.7 |
| 616 | 1250 | 3190 | 1.7 | −8.6 | +0.4 | 8.6 | 12.7 | 10.8 |
| 617* | 1250 | 3030 | 9.1 | −22.6 | −3.6 | 22.6 | 9.3 | 6.3 |
| 618* | 1280 | 3150 | 6.4 | −14.7 | +2.8 | 14.7 | 8.7 | 6.5 |
| 619 | 1250 | 3210 | 1.9 | −10.8 | +4.2 | 10.8 | 12.4 | 10.6 |
| 620 | 1230 | 3190 | 1.7 | −9.7 | +2.8 | 9.7 | 12.5 | 10.8 |
| 621* | 1230 | 3150 | 1.8 | −8.7 | +2.5 | 8.7 | 9.8 | 6.9 |
| 622* | 1300 | 2890 | 2.6 | −9.2 | +3.9 | 9.2 | 11.8 | 10.1 |
| 623 | 1250 | 3180 | 1.7 | −8.8 | +3.2 | 8.8 | 12.7 | 10.7 |
| 624* | 1230 | 2860 | 1.6 | −8.0 | +3.8 | 8.0 | 12.5 | 10.1 |
| 625 | 1280 | 3150 | 1.8 | −10.8 | −6.8 | 10.8 | 12.6 | 10.6 |
| 626* | 1360 | 3130 | 1.6 | −11.6 | −7.7 | 11.6 | 11.7 | 10.0 |
| 627* | 1250 | 3160 | 1.6 | −17.1 | −3.6 | 17.8 | 11.6 | 10.1 |
| 628* | 1250 | 3170 | 1.7 | −15.6 | −8.6 | 15.8 | 11.8 | 10.2 |
| 629 | 1280 | 3220 | 1.6 | −5.6 | −6.8 | 9.2 | 12.4 | 10.8 |
| 630 | 1250 | 3120 | 1.7 | −5.0 | −5.8 | 7.4 | 12.2 | 10.6 |
| 631 | 1250 | 3040 | 1.6 | −4.2 | −3.5 | 9.6 | 12.3 | 10.6 |
| 632* | 1280 | 2890 | 1.5 | −3.1 | −9.6 | 9.6 | 11.6 | 9.7 |
| 633* | 1250 | 2630 | 1.6 | −9.1 | +3.5 | 9.1 | 12.2 | 10.6 |
| 634* | 1250 | 2450 | 1.7 | −8.0 | +3.7 | 10.6 | 12.1 | 10.3 |

*indicates out of the scope of the invention

TABLE 15

| SAMPLE No. | BaTiO$_3$ (mol %) | Re$_2$O$_3$ (mol %) | CO$_2$O$_3$ (mol %) | CaO (mol %) | MnO (mol %) | MgO (mol %) | OXIDE GLASS (wt parts) |
|---|---|---|---|---|---|---|---|
| 701 | 97.0 | Dy$_2$O$_3$ 1.5 | 1.5 | 1.5 | 1.0 | 1.0 | 1.0 |
| 702 | 99.0 | Dy$_2$O$_3$ 0.5 | 0.5 | 1.5 | 1.0 | 1.0 | 1.0 |
| 703* | 99.6 | Dy$_2$O$_3$ 0.2 | 0.2 | 1.5 | 1.0 | 1.0 | 1.0 |
| 704* | 90.0 | Dy$_2$O$_3$ 5.0 | 5.0 | 1.5 | 1.0 | 1.0 | 1.0 |
| 705 | 93.0 | Dy$_2$O$_3$ 3.0 | 4.0 | 1.5 | 1.0 | 1.0 | 1.0 |
| 706 | 97.5 | Ho$_2$O$_3$ 1.5 | 1.0 | 2.0 | 1.0 | 2.0 | 1.0 |
| 707 | 96.5 | Ho$_2$O$_3$ 1.5 | 2.0 | 0.5 | 1.5 | 2.0 | 1.0 |
| 708 | 96.5 | Ho$_2$O$_3$ 1.5 | 2.0 | 0.3 | 1.5 | 2.0 | 1.0 |
| 709* | 96.5 | Ho$_2$O$_3$ 1.5 | 2.0 | 0.1 | 1.5 | 2.0 | 1.0 |
| 710 | 96.5 | Ho$_2$O$_3$ 1.5 | 2.0 | 3.0 | 1.5 | 2.0 | 1.0 |
| 711 | 96.5 | Ho$_2$O$_3$ 1.5 | 2.0 | 4.0 | 1.5 | 2.0 | 1.0 |
| 712* | 96.5 | Ho$_2$O$_3$ 1.5 | 2.0 | 5.0 | 1.5 | 2.0 | 1.0 |
| 713 | 97.5 | Tb$_2$O$_3$ 1.0 | 1.5 | 1.5 | 2.5 | 3.0 | 1.5 |
| 714 | 97.5 | Tb$_2$O$_3$ 1.0 | 1.5 | 2.0 | 3.0 | 3.0 | 1.5 |
| 715* | 97.5 | Tb$_2$O$_3$ 1.0 | 1.5 | 2.0 | 3.5 | 3.0 | 1.5 |
| 716 | 97.5 | Tb$_2$O$_3$ 1.0 | 1.5 | 2.0 | 0.3 | 3.0 | 1.5 |
| 717* | 97.5 | Tb$_2$O$_3$ 1.0 | 1.5 | 2.0 | 0.1 | 3.0 | 1.5 |
| 718 | 96.5 | Er$_2$O$_3$ 2.0 | 1.5 | 2.0 | 1.5 | 2.0 | 2.0 |
| 719* | 96.5 | Er$_2$O$_3$ 2.0 | 1.5 | 2.0 | 1.5 | 2.0 | 3.0 |
| 720 | 96.5 | Er$_2$O$_3$ 2.0 | 1.5 | 2.0 | 1.5 | 2.0 | 0.5 |
| 721* | 96.5 | Er$_2$O$_3$ 2.0 | 1.5 | 2.0 | 1.5 | 2.0 | 0.3 |
| 722* | 98.0 | Dy$_2$O$_3$ 1.5 | 0.5 | 1.5 | 1.0 | 0.2 | 1.5 |
| 723* | 98.0 | Dy$_2$O$_3$ 1.5 | 0.5 | 1.5 | 1.0 | 0.4 | 1.5 |
| 724 | 98.0 | Dy$_2$O$_3$ 1.5 | 0.5 | 1.5 | 1.0 | 3.0 | 1.5 |
| 725 | 98.0 | Dy$_2$O$_3$ 1.5 | 0.5 | 1.5 | 1.0 | 4.0 | 1.5 |
| 726 | 98.0 | Dy$_2$O$_3$ 1.5 | 0.5 | 1.5 | 1.0 | 5.0 | 1.5 |
| 727* | 98.0 | Dy$_2$O$_3$ 1.5 | 0.5 | 1.5 | 1.0 | 6.0 | 1.5 |
| 728* | 98.0 | Dy$_2$O$_3$ 1.5 | 0.5 | 1.5 | 1.0 | 1.0 | 1.5 |
| 729* | 98.0 | Dy$_2$O$_3$ 1.5 | 0.5 | 1.5 | 1.0 | 1.0 | 1.5 |

*indicates out of the scope of the invention

TABLE 16

| SAMPLE No. | FIRING TEMPERATURE (°C.) | DIELECTRIC CONSTANT $\epsilon$ | DIELECTRIC LOSS tan δ (%) | TCC (%) −55° C. | TCC (%) +125° C. | $C_{MAX}$ | INSULATION RESISTANCE log IR |
|---|---|---|---|---|---|---|---|
| 701 | 1280 | 3120 | 1.6 | −6.8 | −3.2 | 9.7 | 12.5 |
| 702 | 1280 | 3390 | 1.7 | −7.6 | −3.3 | 8.6 | 12.6 |
| 703* | 1300 | 3360 | 1.6 | −10.6 | +24.4 | 24.4 | 12.6 |
| 704* | 1300 | 2810 | 1.6 | −9.8 | −6.6 | 9.8 | 11.8 |
| 705 | 1280 | 3280 | 1.7 | −9.4 | −3.3 | 9.4 | 12.6 |
| 706 | 1280 | 3240 | 1.6 | −9.8 | −1.3 | 9.8 | 12.6 |
| 707 | 1280 | 3210 | 1.8 | −11.8 | −3.8 | 11.8 | 12.5 |
| 708 | 1280 | 3170 | 1.6 | −10.6 | −4.8 | 10.6 | 12.6 |
| 709* | | unmeasurable as being semiconductive | | | | | |
| 710 | 1300 | 3230 | 2.0 | −10.6 | −4.7 | 10.8 | 12.2 |
| 711 | 1300 | 3070 | 2.1 | −9.7 | −5.2 | 9.7 | 12.1 |
| 712* | | unmeasurable as not sintered enough at 1360° C. | | | | | |
| 713 | 1260 | 3180 | 1.7 | −7.8 | −4.6 | 8.6 | 12.4 |
| 714 | 1260 | 3220 | 1.6 | −5.4 | −7.4 | 8.4 | 12.1 |
| 715* | 1260 | 3070 | 1.8 | −3.4 | −9.2 | 9.2 | 11.1 |
| 716 | 1280 | 3190 | 1.7 | −9.6 | −3.3 | 9.6 | 12.2 |
| 717* | 1280 | 2950 | 8.7 | −20.6 | −3.6 | 20.6 | 9.4 |
| 718 | 1260 | 3090 | 1.6 | −9.1 | −4.3 | 9.1 | 12.6 |
| 719* | 1260 | 2890 | 1.7 | −7.8 | −3.8 | 8.8 | 12.4 |
| 720 | 1300 | 3160 | 1.7 | −9.8 | −6.8 | 9.8 | 12.5 |
| 721* | 1360 | 3130 | 1.8 | −8.3 | −3.1 | 9.6 | 11.4 |
| 722* | 1280 | 3130 | 1.6 | −17.6 | −4.1 | 17.6 | 11.7 |
| 723* | 1280 | 3220 | 1.6 | −14.8 | −7.1 | 14.8 | 11.9 |
| 724 | 1300 | 3220 | 1.7 | −7.8 | −9.2 | 9.2 | 12.5 |
| 725 | 1280 | 3170 | 1.7 | −7.4 | −6.8 | 9.4 | 12.3 |
| 726 | 1280 | 3030 | 1.7 | −8.6 | −5.8 | 8.6 | 12.2 |
| 727* | 1280 | 2860 | 1.6 | −8.2 | −3.6 | 9.2 | 11.6 |
| 728* | 1280 | 2630 | 1.7 | −7.2 | −3.3 | 9.8 | 12.2 |
| 729* | 1280 | 2460 | 1.6 | −7.0 | −3.7 | 8.9 | 12.0 |

*indicates out of the scope of the invention

TABLE 17

| SAMPLE No. | $BaTiO_3$ (mol %) | $Re_2O_3$ (mol %) | | $CO_2O_3$ (mol %) | SrO (mol %) | MnO (mol %) | MgO (mol %) | OXIDE GLASS (wt parts) |
|---|---|---|---|---|---|---|---|---|
| 801 | 97.0 | $Dy_2O_3$ | 1.5 | 1.5 | 1.5 | 1.0 | 1.0 | 1.0 |
| 802 | 99.0 | $Dy_2O_3$ | 0.5 | 0.5 | 1.5 | 1.0 | 1.0 | 1.0 |
| 803* | 99.6 | $Dy_2O_3$ | 0.2 | 0.2 | 1.5 | 1.0 | 1.0 | 1.0 |
| 804* | 90.0 | $Dy_2O_3$ | 5.0 | 5.0 | 1.5 | 1.0 | 1.0 | 1.0 |
| 805 | 93.0 | $Dy_2O_3$ | 3.0 | 4.0 | 1.5 | 1.0 | 1.0 | 1.0 |
| 806 | 97.5 | $Ho_2O_3$ | 1.5 | 1.0 | 2.0 | 1.0 | 2.0 | 1.5 |
| 807 | 96.5 | $Ho_2O_3$ | 1.5 | 2.0 | 0.5 | 1.5 | 2.0 | 1.5 |
| 808 | 96.5 | $Ho_2O_3$ | 1.5 | 2.0 | 0.3 | 1.5 | 2.0 | 1.5 |
| 809* | 96.5 | $Ho_2O_3$ | 1.5 | 2.0 | 0.1 | 1.5 | 2.0 | 1.5 |
| 810 | 96.5 | $Ho_2O_3$ | 1.5 | 2.0 | 3.0 | 1.5 | 2.0 | 1.5 |
| 811 | 96.5 | $Ho_2O_3$ | 1.5 | 2.0 | 4.0 | 1.5 | 2.0 | 1.5 |
| 812* | 96.5 | $Ho_2O_3$ | 1.5 | 2.0 | 5.0 | 1.5 | 2.0 | 1.5 |
| 813 | 98.5 | $Tb_2O_3$ | 1.0 | 0.5 | 1.5 | 2.5 | 3.0 | 1.0 |
| 814 | 98.5 | $Tb_2O_3$ | 1.0 | 0.5 | 1.5 | 3.0 | 3.0 | 1.0 |
| 815* | 98.5 | $Tb_2O_3$ | 1.0 | 0.5 | 1.5 | 3.5 | 3.0 | 1.0 |
| 816 | 98.5 | $Tb_2O_3$ | 1.0 | 0.5 | 1.5 | 0.3 | 3.0 | 1.0 |
| 817* | 98.5 | $Tb_2O_3$ | 1.0 | 0.5 | 1.5 | 0.1 | 3.0 | 1.0 |
| 818 | 96.0 | $Er_2O_3$ | 2.0 | 2.0 | 1.5 | 1.5 | 2.0 | 2.0 |
| 819* | 96.0 | $Er_2O_3$ | 2.0 | 2.0 | 1.5 | 1.5 | 2.0 | 3.0 |
| 820 | 96.0 | $Er_2O_3$ | 2.0 | 2.0 | 1.5 | 1.5 | 2.0 | 0.5 |
| 821* | 96.0 | $Er_2O_3$ | 2.0 | 2.0 | 1.5 | 1.5 | 2.0 | 0.3 |
| 822* | 97.5 | $Dy_2O_3$ | 1.5 | 1.0 | 1.5 | 1.0 | 0.2 | 1.5 |
| 823* | 97.5 | $Dy_2O_3$ | 1.5 | 1.0 | 1.5 | 1.0 | 0.4 | 1.5 |
| 824 | 97.5 | $Dy_2O_3$ | 1.5 | 1.0 | 1.5 | 1.0 | 3.0 | 1.5 |
| 825 | 97.5 | $Dy_2O_3$ | 1.5 | 1.0 | 1.5 | 1.0 | 4.0 | 1.5 |
| 826 | 97.5 | $Dy_2O_3$ | 1.5 | 1.0 | 1.5 | 1.0 | 5.0 | 1.5 |
| 827* | 97.5 | $Dy_2O_3$ | 1.5 | 1.0 | 1.5 | 1.0 | 6.0 | 1.5 |
| 828* | 97.5 | $Dy_2O_3$ | 1.5 | 1.0 | 1.5 | 1.0 | 1.0 | 1.5 |
| 829* | 97.5 | $Dy_2O_3$ | 1.5 | 1.0 | 1.5 | 1.0 | 1.0 | 1.5 |

*indicates out of the scope of the invention

TABLE 18

| SAMPLE No. | FIRING TEMPERATURE (°C.) | DIELECTRIC CONSTANT $\epsilon$ | DIELECTRIC LOSS tan δ (%) | TCC (%) −55° C. | TCC (%) +125° C. | $C_{MAX}$ | INSULATION RESISTANCE log IR |
|---|---|---|---|---|---|---|---|
| 801 | 1280 | 3260 | 1.7 | +2.6 | −6.7 | 8.3 | 12.5 |
| 802 | 1280 | 3390 | 1.8 | +3.1 | −2.5 | 7.6 | 12.6 |
| 803* | 1300 | 3380 | 1.5 | −13.6 | +26.7 | 43.5 | 12.6 |
| 804* | 1280 | 2780 | 1.8 | +2.8 | −3.6 | 8.8 | 11.7 |
| 805 | 1280 | 3190 | 1.8 | +3.2 | −3.8 | 9.4 | 12.4 |

TABLE 18-continued

| SAMPLE No. | FIRING TEMPERATURE (°C.) | DIELECTRIC CONSTANT $\epsilon$ | DIELECTRIC LOSS tan δ (%) | TCC (%) −55° C. | TCC (%) +125° C. | $C_{MAX}$ | INSULATION RESISTANCE log IR |
|---|---|---|---|---|---|---|---|
| 806 | 1280 | 3270 | 1.7 | +1.6 | −3.5 | 8.4 | 12.6 |
| 807 | 1260 | 3290 | 1.8 | +2.2 | −6.7 | 12.7 | 12.5 |
| 808 | 2160 | 3180 | 1.7 | +0.8 | −5.6 | 9.8 | 12.6 |
| 809* | unmeasurable as being semiconductive | | | | | | |
| 810 | 1300 | 3090 | 1.9 | +1.6 | −3.6 | 7.8 | 12.4 |
| 811 | 1300 | 3030 | 1.9 | +2.3 | −7.7 | 11.6 | 12.2 |
| 812* | unmeasurable as not sintered enough at 1360° C. | | | | | | |
| 813 | 1280 | 3310 | 1.7 | +3.2 | −8.6 | 11.8 | 12.4 |
| 814 | 1260 | 3260 | 1.8 | +3.6 | −8.3 | 12.1 | 12.3 |
| 815* | 1260 | 3030 | 1.8 | +3.9 | −8.5 | 12.4 | 10.3 |
| 816 | 1280 | 3210 | 1.6 | +2.1 | −6.1 | 8.2 | 12.5 |
| 817* | 1280 | 3360 | 16.7 | −3.6 | −6.3 | 9.1 | 8.6 |
| 818 | 1260 | 3040 | 1.7 | +2.1 | −4.4 | 8.6 | 12.3 |
| 819* | 1260 | 2810 | 1.8 | +3.0 | −4.7 | 8.8 | 12.1 |
| 820 | 1300 | 3410 | 1.7 | +2.2 | −7.2 | 10.3 | 12.5 |
| 821* | 1360 | 3310 | 1.9 | +1.9 | −8.8 | 10.7 | 11.4 |
| 822* | 1280 | 3210 | 1.4 | −16.3 | −8.6 | 16.3 | 11.6 |
| 823* | 1280 | 3170 | 1.4 | −14.9 | −7.7 | 14.9 | 11.8 |
| 824 | 1280 | 3200 | 1.7 | +2.7 | −7.8 | 10.6 | 12.4 |
| 825 | 1280 | 3130 | 1.7 | +3.2 | −8.2 | 11.7 | 12.3 |
| 826 | 1300 | 3110 | 1.6 | +3.6 | −8.6 | 12.4 | 12.1 |
| 827* | 1280 | 2830 | 1.8 | +3.8 | −9.0 | 12.7 | 11.6 |
| 828* | 1280 | 2780 | 1.7 | +2.7 | −6.0 | 8.6 | 12.5 |
| 829* | 1280 | 2660 | 1.6 | +2.9 | −6.2 | 8.9 | 12.3 |

*indicates out of the scope of the invention

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A nonreducing dielectric ceramic composition, comprising:
   a) 100 mole % of main components comprising $Co_2O_3$, $BaTiO_3$ containing alkali metal oxide impurities in an amount less than 0.04 weight %, at least one rare earth metal oxide having the general formula $Re_2O_3$ and selected from the group consisting of $Tb_2O_3$, $Dy_2O_3$, $Ho_2O_3$ and $Er_2O_3$, the main components being present in the composition in amounts within the following ranges:

| $BaTiO_3$ | 92.0–99.4 mol %; |
|---|---|
| $Re_2O_3$ | 0.3–4.0 mol %; and |
| $Co_2O_3$ | 0.3–4.0 mol %; and | b) subcomponents comprising BaO, MnO and MgO, the subcomponents being present in the composition in amounts, based upon 100 mole % of the main components, in addition to the 100% mol of the main components and within the following ranges:

| BaO | 0.2–4.0 mol %; |
|---|---|
| MnO | 0.2–3.0 mol %; and |
| MgO | 0.5–5.0 mol %. |

2. A nonreducing dielectric ceramic composition according to claim 1, further comprising oxide glass in an amount within the range of 0.5–2.5 weight parts based upon 100 weight parts of the non-reducing dielectric ceramic composition, the oxide glass containing $BaO-SrO-Li_2O-SiO_2$.

3. A nonreducing dielectric ceramic composition according to claim 1, further comprising $CaTiO_3$ as a subcomponent, the $CaTiO_3$ being present in the composition in an amount within the range of 0.5–4.0 mol %, and oxide glass in an amount within the range of 0.5–2.5 weight parts based upon 100 weight parts of the nonreducing dielectric ceramic composition, the oxide glass containing $BaO-SrO-Li_2O-SiO_2$.

4. A nonreducing dielectric ceramic composition according to claim 1, further comprising $CaZrO_3$ as a subcomponent, the $CaZrO_3$ being present in an amount within the range of 0.5–3.5 mol %, and oxide glass in an amount within the range of 0.5–2.5 weight parts based upon 100 weight parts of the nonreducing dielectric ceramic composition, the oxide glass containing $BaO-SrO-Li_2O-SiO_2$.

5. A nonreducing dielectric ceramic composition according to claim 1, further comprising $SiO_2$ as a subcomponent, the $SiO_2$ being present in an amount within the range of 0.2–3.0 mol %.

6. A nonreducing dielectric ceramic composition according to claim 1, further comprising NiO, $Al_2O_3$ or mixtures thereof as a subcomponent, the NiO, $Al_2O_3$ or mixtures thereof being present in an amount within the range of 0.3–3.0 mol %.

7. A nonreducing dielectric ceramic composition according to claim 1, further comprising NiO, $Al_2O_3$ or mixture thereof as a subcomponent, the NiO, $Al_2O_3$ or mixture thereof being present in an amount within the range of 0.3–3.0 mol %, and oxide glass in an amount within the range of 0.5–2.5 weight parts based upon 100 weight parts of the nonreducing dielectric ceramic composition, the oxide glass containing $BaO-SrO-LiO_2-SiO_2$.

8. A nonreducing dielectric ceramic composition, comprising:
   a) 100 mole % of main components comprising $Co_2O_3$, $BaTiO_3$ containing alkali metal oxide impurities in an amount less than 0.04 weight %, at least one rare earth metal oxide having the general formula $Re_2O_3$ and selected from the group consisting of $Tb_2O_3$, $Dy_2O_3$, $Ho_2O_3$ and $Er_2O_3$, the main components being present in the composition in amounts within the following ranges:

| | |
|---|---|
| $BaTiO_3$ | 92.0–99.4 mol %; |
| $Re_2O_3$ | 0.3–4.0 mol %; and |
| $Co_2O_3$ | 0.3–4.0 mol %; and | b) subcomponents comprising CaO, MnO and MgO, the subcomponents being present in the composition in amounts, based upon 100 mol % of the main components, in addition to the 100 mol % of the main components and within the following ranges:

| | |
|---|---|
| CaO | 0.2–4.0 mol %; |
| MnO | 0.2–3.0 mol %; |
| MgO | 0.5–5.0 mol %; | and oxide glass in an amount within the range of 0.5–2.5 weight parts based upon 100 weight parts of the main components and subcomponents, the oxide glass containing $BaO\text{-}SrO\text{-}Li_2O\text{-}SiO_2$.

9. A nonreducing dielectric ceramic composition, comprising:

a) 100 mole % of main components comprising $Co_2O_3$, $BaTiO_3$ containing alkali metal oxide impurities in an amount less than 0.04 weight %, at least one rare earth metal oxide having the general formula $Re_2O_3$ and selected from the group consisting of $Tb_2O_3$, $Dy_2O_3$, $Ho_2O_3$ and $Er_2O_3$, the main components being present in the composition in amounts within the following ranges:

| | |
|---|---|
| $BaTiO_3$ | 92.0–99.4 mol %; |
| $Re_2O_3$ | 0.3–4.0 mol %; and |
| $Co_2O_3$ | 0.3–4.0 mol %; and | b) subcomponents comprising SrO, MnO and MgO, the subcomponents being present in the composition in amounts, based upon 100 mol % of the main components, in addition to the 100 mol % of the main components and within the following ranges:

| | |
|---|---|
| SrO | 0.2–4.0 mol %; |
| MnO | 0.2–3.0 mol %; |
| MgO | 0.5–5.0 mol %; | and oxide glass in an amount within the range of 0.5–2.5 weight parts based upon 100 weight parts of the main components and subcomponents, the oxide glass containing $BaO\text{-}SrO\text{-}Li_2O\text{-}SiO_2$.

* * * * *